(12) United States Patent
Laurie et al.

(10) Patent No.: US 8,281,149 B2
(45) Date of Patent: Oct. 2, 2012

(54) PRIVACY-PRESERVING FLEXIBLE ANONYMOUS-PSEUDONYMOUS ACCESS

(75) Inventors: Bennet Laurie, London (GB); Marcel M. Moti Yung, New York, NY (US)

(73) Assignee: Google Inc., Mountain View, CA (US)

( * ) Notice: Subject to any disclaimer, the term of this patent is extended or adjusted under 35 U.S.C. 154(b) by 602 days.

(21) Appl. No.: 12/490,226

(22) Filed: Jun. 23, 2009

(65) Prior Publication Data
US 2010/0325441 A1    Dec. 23, 2010

(51) Int. Cl.
| G06F 21/00 | (2006.01) |
| G06F 7/04 | (2006.01) |
| G06F 15/16 | (2006.01) |
| G06F 15/173 | (2006.01) |
| H04L 29/06 | (2006.01) |
| H04L 9/32 | (2006.01) |

(52) U.S. Cl. ........ 713/185; 713/151; 713/155; 713/161; 713/165; 713/168; 726/5; 726/6; 726/26; 709/217; 709/224; 709/225

(58) Field of Classification Search .................. 713/185, 713/151, 155, 161, 165, 168; 726/5, 6, 26; 709/217, 224, 225
See application file for complete search history.

(56) References Cited

U.S. PATENT DOCUMENTS
2006/0155999 A1 *  7/2006  Holtzman et al. ............ 713/172

OTHER PUBLICATIONS

Bellare et al., "The One-More-RSA-Inversion Problems and the Security of Chaum's Blind Signature Scheme." Journal of Cryptology ( 2003), 29 pages.

Brands et al., "A Practical System for Globally Revoking the Unlinkable Pseudonyms of Unknown Users." Lecture Notes in Computer Science (2007), 15 pages.

Camenisch, et al., "An Efficient System for Non-transferable Anonymous Credentials with Optional Anonymity Revocation." EUROCRYPT (2001), 25 pages.

Camenisch, et al., "Efficient Attributes for Anonymous Credentials." Proceedings of the 15$^{th}$ ACM Conference on Computer and Communications Security (2008), 12 pages.

Chaum, David L., "Untraceable Electronic Mail, Return Addresses, and Digital Pseudonyms." Technical Note Programming Techniques and Data Structures, University of California, Berkeley, (1981), 5 pages.

Verheul, Eric R., "Self-Blindable Credential Certificates from the Weil Pairing." Lecture Notes in Computer Science, Proceedings of the 7th International Conference on the Theory and Application of Cryptology and Information Security: Advances in Cryptology (2001), 19 pages.

* cited by examiner

*Primary Examiner* — Aravind Moorthy
(74) *Attorney, Agent, or Firm* — Fish & Richardson P.C.

(57) ABSTRACT

Systems and methods are disclosed for privacy-preserving flexible user-selected anonymous and pseudonymous access at a relying party (RP), mediated by an identity provider (IdP). Anonymous access is unlinkable to any previous or future accesses of the user at the RP. Pseudonymous access allows the user to associate the access to a pseudonym previously registered at the RP. A pseudonym system is disclosed. The pseudonym system allows a large number of different and unlinkable pseudonyms to be generated using only a small number of secrets held by the user. The pseudonym system can generate tokens capable of including rich semantics in both a fixed format and a free format. The tokens can be used in obtaining from the IdP, confirmation of access privilege and/or of selective partial disclosure of user characteristics required for access at the RPs. The pseudonym system and associated protocols also support user-enabled linkability between pseudonyms.

46 Claims, 7 Drawing Sheets

PRIVACY-PRESERVING FLEXIBLE ANONYMOUS-PSEUDONYMOUS ACCESS

BACKGROUND

Traditionally, most authenticated relationships between users and service/content providers over the internet are established based on credentials such as pairs of username and password. As users interact with an increasing number of service/content providers over the internet, users are required to create and remember an increasing number of passwords. As a security measure against password phishing, service and/or content providers prompt users to choose complex passwords and to change the passwords periodically. The excessive number of evolving passwords often causes confusion and frustration in users, and many users resort to forgoing security for convenience and using a single or a small number of passwords for all of their online access accounts. This practice leaves the users and the online service and/or content providers vulnerable to fraud and hacker attacks.

In addition to the problem of the excessive number of passwords each user has to manage, users are often required to enter the same credential more than once when accessing sub-branches of a service/content provider or accessing the same service/content provider from different entry points of the service/content website. To reduce users' frustration with repeated password entries, many organizations are migrating to single sign-on (SSO) systems for their users within the organizations. SSO systems allow a user to access many services without having to manually authenticate more than once. SSO systems that go beyond organization boundaries have also been proposed. In past years, industry efforts have resulted in a number of specifications and standards aimed at cross-organizational SSO. However, few organizations have adopted cross-organizational SSO systems, especially in consumer facing settings due to the privacy issues involved in the current cross-organizational SSO systems. For example, one of the privacy issues is a result of users identifying themselves to numerous unrelated organizations, enabling these organizations, in collusion, to collect and correlate a vast amount of information about each of these users.

SUMMARY

This specification describes technologies relating to privacy-preserving access at Relying Parties (RPs), such as service providers, mediated by an Identity Provider, or multiple Identity Providers (IdPs).

The specification describes methods and protocols for preserving user privacy in transactions involving multiple system entities (i.e., a multitude of RPs and IdPs) using a minimal and flexible pseudonym system. The pseudonym system allows a large number of different and unlinkable pseudonyms to be generated on behalf of a user using only a small number of secrets held by the user. The pseudonym system can also subsequently generate additional tokens capable of including rich semantics in both a fixed format and a free format. The additional tokens can include fixed-sized as well as unbounded information fields. The tokens can be used in obtaining from the IdP, confirmation of access privilege and/or of selective partial disclosure of user characteristics required for access at the RPs (e.g., service providers).

As an example, first, the user proves ownership of a pseudonym to the IdP without revealing the secret keys associated with the pseudonym. The proof of ownership identifies the user as associated with a pseudonym currently registered at the IdP. In some implementations, the currently registered pseudonym is the user's actual identifier at the IdP.

Then, the IdP checks access privilege and potentially also selective partial disclosure of user characteristics of the user on behalf of the RP and issues a first representation of an access token to the user. In some implementations, the issuance of the first representation of the access token is made in cooperation with the user. In some implementations, the IdP issues the first representation of the access token by signing a partial representation of the access token (e.g., an unsigned and blinded original token) given by the user.

The user, then, modifies the first representation of the access token to obtain a second representation of the access token that is not linkable to the first representation of the access token issued by the IdP. In some implementations, the modification performed by the user is a transformation from the IdP signature (i.e., the first representation of the access token) to another valid IdP signature (i.e., the second representation of the access token) on the original token. The transformation is based on the availability of random elements used in generating the partial representation of access token (e.g., the unsigned and blinded original token) which was presented to the IdP for signing.

After the user obtains the second representation of the access token, the user then presents the second representation of the access token to the RP who can verify the validity of the access token and/or the validity of selective disclosure properties associated with presented access token. The RP grants or denies access to transactions, data and/or services it handles based on the result of the verification. Some implementations of the verification procedure by the RP can involve the IdP as well.

The access token representations that are utilized in the methods described in this specification are capable of expressing rich semantics. In some implementations, parts of the rich semantics included in an access token can be made known to the IdP while other parts are kept hidden from the IdP during the exchanges of the access token. The user can decide what information to include and what format to use in the access token. The information fields in the access token can be fixed-sized, unbounded, or a combination of both, even though representation as given to the IdP is bounded in size and may be of a fixed size.

The pseudonym system and associated protocols described in this specification supports both anonymous access and pseudonymous access according to user choice. Anonymous access involves only the access token and the access is unlinkable to any previous or future accesses of the user at the RP. Pseudonymous access allows the user to associate the access to a pseudonym previously registered at the RP. For pseudonymous access, the user offers proof of ownership for the pseudonym previously registered at the RP without giving away any secrets associated with the pseudonym. The user can choose to access the RP anonymously by only proving possession of the access token. The user can also choose to access the RP pseudonymously by proving the possession of the registered pseudonym at the RP without necessarily revealing its secrets. In some implementations, the proof of pseudonym ownership is typically performed in combination with the presentation of the access token.

The decision of whether to access the RP anonymously or pseudonymously can be made by user's choice. Sometimes, the type of access method is prescribed by the business relationship between the user and the RP and/or the type of services that are involved. Full anonymity and unlinkability between transactions are not inevitable according to the system and protocols described in this specification. The flexibility of access mode can be a desirable feature since sometimes the user may prefer to link some transactions to a pseudonymous identity while keeping others completely anonymous. In addition, the flexibility allows a user to access RPs that employ different access models using the same pseudonym system described in this specification.

The pseudonym system and associated protocols also support user-enabled linkability between pseudonyms. A user can choose to operate in a mode where he/she can prove or deny possession of multiple pseudonyms generated using the pseudonym system. Alternatively, the user can also choose to operate in a mode where linkability between pseudonyms is disabled.

Methods and protocols for privacy-preserving access at RPs, mediated by IdPs are disclosed.

In one aspect, a method (user-side) includes: registering with an IdP to establish a first pseudonym; upon successful proof of possession of the first pseudonym to the IdP, receiving a first representation of an access token from the IdP for accessing the RP; transforming, by a processor, the first representation of the access token to obtain a second representation of the access token, the second representation of the access token being a valid access token and is unlinkable to the first representation of the access token by the IdP; receiving a request from the user to access the RP; determining whether the request is for accessing the RP anonymously or pseudonymously. If the request is for anonymous access, the method further includes: providing the second representation of the access token to the RP anonymously; and gaining access to the RP upon verification of the second representation of the access token, the anonymous access being unlinkable to any previous and any future access at the RP, and unlinkable to the IdP's interaction with any particular user. If the request is for pseudonymous access, the method further includes: providing to the RP the second representation of the access token and proof of possession of a second pseudonym that is previously registered with the RP; and gaining access to the RP upon successful verification of the second representation of the access token and proof of possession of the second pseudonym, wherein the pseudonymous access is linkable to the second pseudonym, unlinkable to the IdP's interaction with any particular user, and unlinkable to any past and future access to the RP that does not employ the second pseudonym.

In some implementations, receiving the first representation of the access token from the IdP further includes: generating an original token; modifying the original token to obtain a modified token; and providing the modified token to the IdP to obtain an access token for accessing the RP.

In some implementations, the first representation of the access token includes a signed modified token by the IdP and second representation of the access token includes a signed original token by the IdP.

In some implementations, the original token is generated cryptographically from a pre-image, the pre-image supports both fixed-format and free-format information structures.

In some implementations, the pre-image contains at least one of transaction-specific and user-specific information that is fully or partially revealed to the RP but not to the IdP.

In some implementations, the RP is one of a plurality of RPs, the IdP is one of a plurality of IdPs, and the pre-image encodes information that is specific to the RP and the IdP.

In some implementations, the first representation and the second representation of the access token are privately verifiable by the IdP, and the verification of the second representation of the access token is performed by the IdP.

In some implementations, the first representation and the second representation of the access token are publicly verifiable, and the verification of the second representation of the access token is performed by the RP.

In some implementations, proof of possession of the second pseudonym is made by a zero-knowledge proof, by signing, or by decrypting a challenge.

In some implementations, the method further includes: generating one or more pseudonyms for registration at the RP and the IdP using a pseudonym system, wherein the pseudonym system is operable to create an unbounded number of pseudonyms based on a fixed number of cryptographic keys.

In some implementations, the method further includes: linking or denying linkage between two pseudonyms generated by the pseudonym system in zero-knowledge.

In some implementations, the method further includes: generating a temporary pseudonym based on the second pseudonym; interactively proving to the RP possession of the second pseudonym using the temporary pseudonym; and expunging linkage between the temporary pseudonym and the second pseudonym.

In some implementations, one or more of the original token, the modified token, and the signed modified token encode a partial disclosure based on one or more characteristics of the user known to the IdP, the partial disclosure being a confirmation of at least some characteristics required for user access at the RP.

In some implementations, the method further includes: sharing each component of a secret key used by the user with a distinct trusted authority among a plurality of trusted authorities, wherein the at least one of the first pseudonym and the second pseudonym is revoked when a quorum of the plurality of trusted authorities in possession of the each component of the secret key collude to reveal the secret key used by the user.

In some implementations, the method further includes: sharing each component of a secret key with a distinct trusted authority among a plurality of trusted authorities, wherein the first representation of the access token and the second representation of the access token is linkable to the user when a quorum of the trusted authorities in possession of the each component collude to reveal the secret employed by the user.

In another aspect, a method (IdP side) includes: receiving the user's registration of a first pseudonym at the IdP in a previous session; upon verification of the user's possession of the first pseudonym, generating, by a processor, a first representation of an access token to the user for accessing the RP, wherein the first representation of the access token selectively encodes a partial disclosure based on one or more characteristics of the user known to the IdP, the partial disclosure being a confirmation of at least some characteristics required for user access at the RP, the first representation of the access token being modifiable to a second representation of the access token that is unlinkable to the first representation of the access token, and the second representation of the access token remaining as a valid access token for accessing the RP; and providing the first representation of the access token to the user for accessing the RP.

In some implementations, the method further includes: receiving a modified token from the user, wherein the modified token is generated by a cryptographic transformation from a original token, the original token is generated from a pre-image, and the pre-image supports both fixed-format and free-format information structures and contains information that is revealed to the RP but not to the IdP.

In some implementations, the method further includes: receiving the second representation of the access token, wherein the second presentation of the access token is derived from the first representation of the access token by the user; and verifying the second representation of the access token without ability to link the second representation of the access token to the first representation of the access token.

In some implementations, the first representation and the second representation of the access token are publicly verifiable, and the verification of the second representation of the access token is performed by the RP.

In some implementations, the first representation and the second representation of the access token are privately verifiable by the IdP, and the verification of the second representation of the access token is performed by the IdP.

In some implementations, the first representation of the access token includes a confirmation of at least some user characteristics required for access at the RP.

In some implementations, the IdP is an authority with information regarding user characteristics, and the method further comprises checking access requirements of the RP and verifying the user characteristics for access eligibility at the RP.

In another aspect, the method (RP side) includes: receiving a request to access the RP from the user, the request comprising a second representation of an access token, the second representation of the access token being based on a first representation of the access token issued to the user by the IdP, the second representation of the access token being unlinkable to the first representation of the access token by the RP and the IdP individually, and the second representation of the access token being unlinkable to the first representation of the access token by the RP and the IdP in collusion. If the first representation of the access token is publicly verifiable, the method further includes: verifying, by a processor, the second representation of the access token; and providing access to the user upon successful verification of the second representation of the access token. If the first representation of the access token is privately verifiable by the IdP, the method further includes: presenting the second representation of the access token to the IdP for verification; and providing access to the user if the IdP successfully verifies the second representation of the access token.

In some implementations, the request is for anonymous access at the RP, and the anonymous access is unlinkable to any previous and future access at the RP.

In some implementations, the request is for pseudonymous access at the RP, and the pseudonymous access is linkable to a pseudonym previously registered at the RP.

In some implementations, the method further includes: receiving proof of possession of the pseudonym previously registered at the RP, wherein the proof is made by a zero-knowledge proof, by signing, or by decrypting a challenge.

In some implementations, the request further includes a pre-image, the pre-image supports both fixed-format and free-format information structures, the pre-image contains user-specific information that is revealed to the RP but not to the IdP, and the first representation of the access token is generated from the pre-image through cryptographic transformations by the user and the IdP.

In some implementations, the RP is one of a plurality of RPs, the IdP is one of a plurality of IdPs, and the pre-image encodes information that is specific to the RP and the IdP.

In some implementations, the information token selectively encodes a partial disclosure based on one or more characteristics of the user known to the IdP, the partial disclosure being a confirmation of at least some characteristics required for user access at the RP.

In another aspect, a method (involving multiple parties) includes: the user registering with the IdP to establish a first pseudonym in a previous session; the user generating an original token for accessing an RP; the user modifying the original token to obtain a modified token; the user providing the modified token to the IdP to obtain confirmation of access authorization; the user proving possession of the first pseudonym previously registered with the IdP to the IdP; upon verification of the user's possession of the first pseudonym, the IdP generating a first representation of an access token by signing the modified token, the first representation of the access token containing the confirmation of access authorization at the RP; the IdP providing the first representation of the access token to the user; the user transforming the signed modified token to obtain a second representation of the access token, wherein the second representation of the access token is unlinkable to the first representation of the access token by the RP and the IdP individually, and is unlinkable by the RP and IdP in collusion; the user determining whether to access the RP anonymously or pseudonymously. If accessing the RP anonymously, the method further includes: the user presenting the second representation of the access token to the RP. If accessing the RP pseudonymously, the method further includes: the user presenting the second representation and proof of possession of a second pseudonym, the second pseudonym being a pseudonym previously registered with the RP. Upon receiving the second representation of the access token, the RP verifying the second representation of the access token. If access is anonymous, the method further includes: the RP providing access to the user upon verification of the second representation of the access token. If access is pseudonymous, the method further includes: the RP providing access to the user upon successful verification of the second representation of the access token and successful verification of the proof of possession of the second pseudonym.

In some implementations, the first representation of the access token is privately verifiable by the IdP, and the method further includes: the RP presenting the second representation of the access token to the IdP for verification; and the IdP verifying the second representation of the access token.

In some implementations, the first representation is publicly verifiable, and the method further includes: the RP verifying the second representation of the access token.

In some implementations, the method further includes: the user generating a pre-image of the token, wherein the pre-image supports fixed-format and free-format data structures; and the user presenting the pre-image to the RP, but not to the IdP.

In some implementations, the pre-image encodes information that is variable in content, format, or size based on user specification.

In some implementations, the RP is one of a plurality of RPs, the IdP is one of a plurality of IdPs, and the pre-image encodes information that is specific to the RP and the IdP.

In some implementations, proof of possession of the second pseudonym is made by a zero-knowledge proof, by signing, or by decrypting a challenge.

In some implementations, the method further includes: the user generating one or more pseudonyms for registration at the RP and the IdP using a pseudonym system, wherein the pseudonym system is operable to create an unbounded number of pseudonyms based on a fixed number of cryptographic keys.

In some implementations, the user linking or denying linkage between two pseudonyms generated using the pseudonym system in zero knowledge.

In some implementations, the method further includes: the user generating a temporary pseudonym based on the second pseudonym; the user interactively proving possession of the second pseudonym to the RP using the temporary pseudonym; and the user expunging linkage between the temporary pseudonym and the second pseudonym.

In some implementations, the method further includes: the IdP selectively encodes a partial disclosure in the information token based on one or more characteristics of the user known to the IdP, the partial disclosure being a confirmation of at least some characteristics required for user access at the RP.

In some implementations, the partial disclosure is based on a signature scheme associated with the characteristics required for user access at the RP.

In some implementations, the method further includes: the user generating a pre-image, the pre-image supports both fixed-format and free-format data structures, and a predetermined portion of the pre-image encodes a partial disclosure required for user access at the RP; the user generating a plurality of original tokens based on the pre-image; the user blinding the plurality of original tokens using a plurality of secret keys to obtain a plurality of blinded tokens; the user presenting the plurality of blinded tokens to the IdP; the IdP designating one blinded token from the plurality of tokens to remain blinded; the user revealing a pre-determined portion of the pre-image and the secret keys for unblinding the plurality of blinded tokens except for the designated blinded token; the IdP unblinding the plurality of blinded tokens using the secret keys except for the designated blinded token; the IdP verifying that the partial disclosure encoded in the pre-determined portion of the pre-image is faithfully represented in each of the plurality of unblinded tokens; and the IdP signing the designated blinded token to obtain the first representation of the access token before providing the first representation of the access token to the user;

In some implementations, the method further includes: the user sharing each component of a secret key with a distinct trusted authority among a plurality of trusted authorities, wherein the first and the second representations of the access token are revoked when a quorum of the trusted authorities in possession of the each component collude to revealed the secret key to the IdP.

In some implementations, the method further includes: the user sharing each component of a secret key with a distinct trusted authority along a plurality of trusted authorities, wherein the first representation of the access token and the second representation of the access token is linkable to the user when a quorum of the trusted authorities in possession of the each component collude to reveal information encrypted under the secret key.

In one aspect, a method for maintaining a pseudonym system capable of generating an unbounded number of unlinkable pseudonyms using a fixed number of cryptographic keys is disclosed. The pseudonym system is capable of reproducing and proving user possession of the pseudonyms to third parties without maintaining persistent copies of the pseudonyms. The method includes: maintaining a pseudonym system on a device, the pseudonym system operable to generate an unbounded number of pseudonyms based on a fixed number of cryptographic keys; generating a plurality of pseudonyms for establishing respective pseudonymous identities with a plurality of entities, the plurality of pseudonyms being generated by the pseudonym system based on at least one of the fixed number of cryptographic keys, and the plurality of pseudonyms being unlinkable to one another by entities that do not possess the cryptographic key; registering each of the plurality of pseudonymous identities with a respective entity in the plurality of entities using a corresponding pseudonym in the plurality of pseudonyms; and reproducing and proving possession of each pseudonymous identity without maintaining a persistent copy of the corresponding pseudonym.

Systems and computer program products corresponding to the methods are also disclosed.

In one aspect, a system for managing user access at relying parties (RPs), mediated by identity providers (IdPs), include: a first subsystem for a user to prove possession of a first pseudonym previously registered with an IdP to the IdP; a second subsystem for the user to obtain a first representation of an access token from the IdP for accessing an RP anonymously; a third subsystem for the user to modify the first representation of the access token to obtain a second representation of the access token for anonymous access at the RP, where the second representation of the access token is unlinkable to the first representation of the access token by the IdP; a fourth subsystem for the user to present the second representation of the access token to the RP either anonymously or pseudonymously based on user choice; a fifth subsystem for the user to connect the second representation of the access token to one of the user's pseudonyms previously registered at the RP, wherein the user's pseudonyms registered at the RP are unlinkable to the pseudonym registered at the IdP; a sixth subsystem for the user to prove possession of a second pseudonym previously registered with the RP to the RP; and a seventh subsystem for allowing user access to the RP upon successful cryptographic proof of either the second representation of the access token for anonymous access, or the second representation of the access token and the pseudonym previously registered with the RP for pseudonymous access.

In some implementations, the system further includes: an eighth subsystem for the user to present to the RP a pre-image of an original token, wherein the pre-image supports fixed format and free-format data structures, and the first presentation of the access token is based on the original token.

In some implementations, the system further includes: a ninth subsystem for the user to generate multiple pseudonyms based on a single secret key for registration with at least one of RPs and IdPs, the multiple pseudonyms being unlinkable by the RPs and the IdPs individually, and being unlinkable by the RPs and the IdPs in collusion, wherein the multiple pseudonyms are selectively linkable by the user in a zero-knowledge fashion.

In some implementations, the system further includes: a tenth subsystem for routing interactions from the user to the RP via a proxy system to hide routing information of the user from the RP.

Particular embodiments of the subject matter described in this specification can be implemented to realize one or more of the following advantages.

The specification describes methods and protocols for supporting user privacy in transactions involving multiple system entities (i.e., a multitude of RPs and IdPs). A user can obtain access tokens from IdPs that can be used at the RPs. However, the IdP does not have the ability to track the use of the access token by the user.

In some implementations, the systems and methods disclosed in this document support both anonymous and pseudonymous access at an RP (e.g., a service provider) using an access token obtained from the identity provider. This flexibility allows the user to control which transactions the user made at a particular service provider should be linkable to which particular pseudonym the user has registered with the service provider, and which transactions should be completely anonymous. Complete anonymity is not required in this system.

In some implementations, the methods and systems disclosed in this document simultaneously support both identity providers providing publicly verifiable credentials and identity providers using privately verifiable credentials. This flexibility can accommodate various existing business models of the identity providers, and reduce the complexity of setting up a system involving multiple identity providers and replying parties.

In some implementations, the methods and systems disclosed in this document support a flexible, free-format, and variable sized token that can encode various information according to user specification. The free-format token can also support fixed-format data structures within a portion of the free-format and variable-sized token.

In some implementations, the methods and systems disclosed in this specification support revocation of pseudonyms and linking of pseudonyms to actual user identity at the time of pseudonym revocation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and protocols for impromptu user-selected anonymous or pseudonymous access at a Relying Party (RP), mediated by an Identity Provider (IdP). The systems and protocols allow the IdP to verify a user's eligibility for accessing the RP on behalf of the RP, and to provide the user with a first representation of an access token that can be used to gain access at the RP. The user transforms the first representation of the access token to obtain a second representation of the access token and uses the second representation of the access token to gain access at the RP. The transformation of the access token is such that the second representation of the access token remains valid as a confirmation of the access privilege or certain user properties from the IdP, however, the RP and the IdP, either individually or colluding, cannot link the second representation of the access token to any particular user who have previously obtained first representations of access tokens from the IdP. The IdP can serve many users and many RPs by providing confirmations of access privilege to users for accessing the many RPs, but doing so without the ability to track any single user's access at any RP. Therefore, user privacy is preserved in this IdP-mediated authentication scheme. The user may choose to access the RP pseudonymously rather than anonymously by also proving its ownership of a pseudonym previously registered at the RP. The mode of access can be chosen based on the type and nature of access, the business relationship between the user and the RP, and/or other factors. The mode of access can be chosen dynamically on a per-access basis by the user.

The Basic System and Protocol

Figure 1:
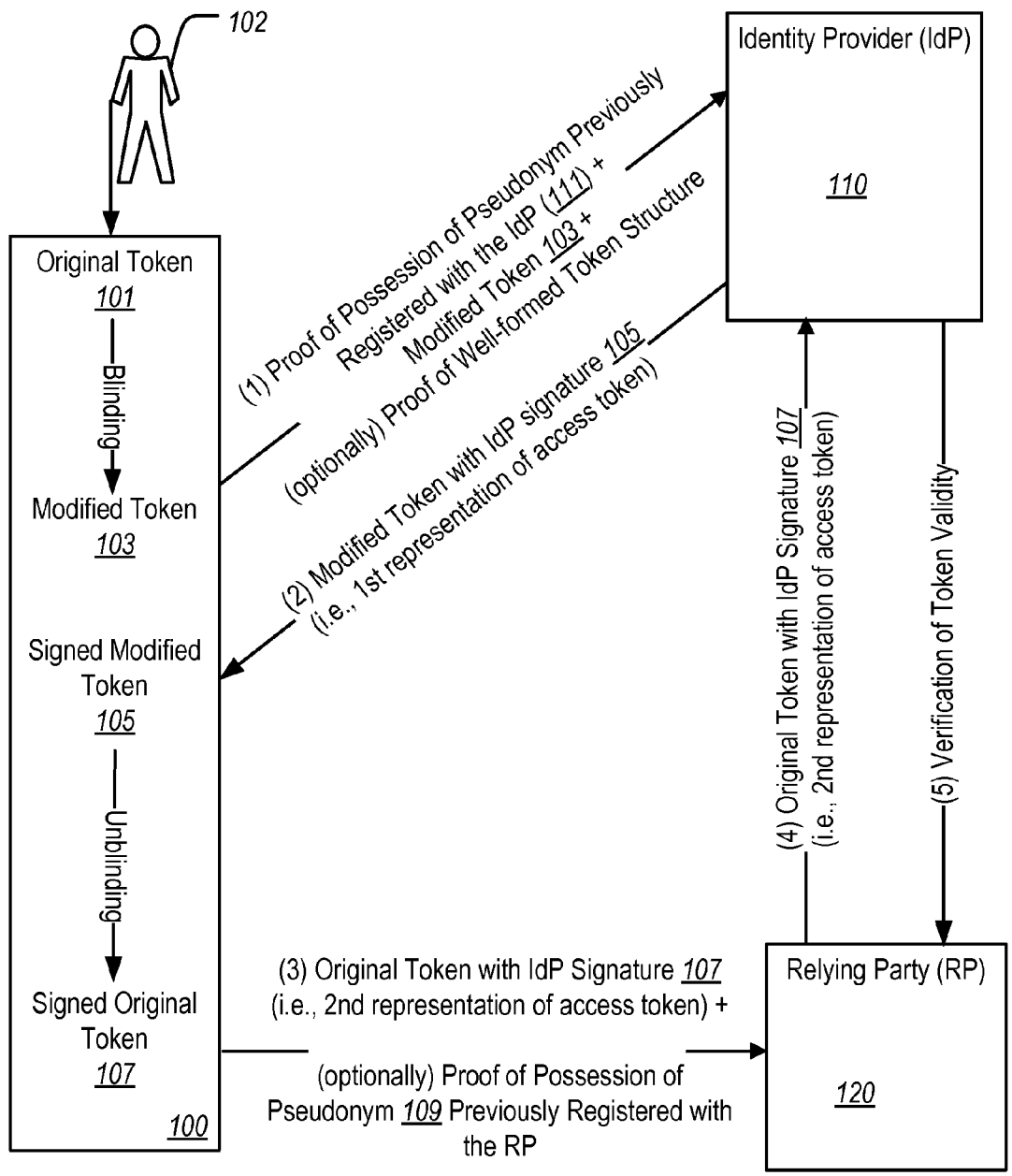
FIG. 1 is a block diagram illustrating the operation of an example system implementing user-selected anonymous or pseudonymous access at an RP, mediated by an IdP.

FIG. 1 illustrates the basic operation of an example system implementing the protocols for impromptu user-selected anonymous or pseudonymous access at a Relying Party (RP), mediated by an Identity Provider (IdP). The entities in the system include at least a user 102 and/or a user agent 100 (e.g., software component implementing the pseudonym system and protocols) operated by the user 102, an IdP 110, and an RP 120. In some implementations, there is an existing account relationship between the IdP 110 and the RP 120, such that the RP 120 will allow a user 102 to access its services if the user 102 provides proof that it is registered with the IdP 110. The user may also have account relationships with the other parties (not shown).

The system shown in FIG. 1 can be used to implement cross-organizational single sign-on (SSO). Once a user registers and signs on at the IdP, the IdP can provide access authorization for the user to use at any RP that has an account relationship with the IdP, without the user having to manually repeat the sign-on at that RP. Alternatively, the IdP can be an information provider or corroborator of some user properties to the RPs.

For example, the IdP can be an entity that provides confirmation regarding whether a user is over the age 18 for accessing certain adult content at the RPs. The IdP holds certain verified information about a user, such as the actual age of the user, and can provide a confirmation of the age (above or below 18) without disclosing the identity of the user or the actual age of the user. In such implementations, the RP can be shielded from the true identity or full information of the user and rely on the IdP to verify the user's access privilege and/or required user properties. In some complex systems, an IdP for some RPs can also be an RP of other IdPs.

The IdP can provide confirmation of access privilege and/or selective disclosure of certain user properties (e.g., age being above or below 18) to an RP, but does not have the ability to track any particular user's use of the IdP's confirmations at various RPs. Therefore, user privacy is protected both from the RPs and from the IdPs. The confirmation of access privilege and selective disclosure of user properties can be provided and obtained in the form of access tokens utilizing blind signatures.

In an initial stage, a user first registers with the IdP to establish an account with the IdP. The account can be based on a pseudonym 111 (e.g., a strong credential that is cryptographic, a username-password pair, or a pseudonym that is not connected to any user ID) for use at the IdP. By using the method described in this specification, the user can generate unlinkable pseudonyms using a small number of cryptographic keys and cryptographic functions. The generated pseudonyms can be selectively linked by the user at a later time. The user (for example, with help of another entity that produces user with legal documents in a paper or electronic formats) can provide certain verifiable user information (such as age, geographical location, professional affiliation, etc.) during the registration process, and/or pay membership fees to the IdP to activate the registered pseudonym.

In some implementations, if, in addition to accessing the RP anonymously, the user also wishes to access the RP pseudonymously on occasion, the user also registers with the RP to establish one or more pseudonyms with the RP. The one or more pseudonyms registered with the RP can come from the same family of pseudonyms (i.e., using the same public and secret keys) as the pseudonym registered with the IdP. Even though the pseudonyms registered with the RP and the IdP share the same secret keys, the RP and the IdP cannot link the pseudonyms, either individually or colluding.

In order to obtain an access token from the IdP to use at an RP, the user first generates an original token 101. This original token 101 can be specific to an RP or general to multiple RPs. The original token may also include other token-specific features, such as duration, type of access, and so on. The original token 101 can be a string containing information. In order to prevent the IdP from tracking the use of this original token 101, the user modifies (i.e., blinds) the original token 101 to obtain a modified token 103. The user then presents the modified token 103 to the IdP to obtain an access token from the IdP. When presenting the modified token 103 to the IdP, the user can also offer proof to the IdP of the user's possession of the pseudonym 111 previously registered with the IdP. Such proof can be offered by signing the modified token 103, decrypting a challenge, or providing a zero-knowledge proof. In some implementations, the user can also offer proof that the modified token has been faithfully generated from an original token that follows a structure that the IdP and the user have agreed upon.

Once the IdP receives and is satisfied with the user's proof of possession of the pseudonym previously registered with the IdP, the IdP can provide a confirmation of the user's access authorization and/or selective disclosure of certain user properties to the user. In some implementations, the IdP can sign the modified token 103 with an IdP signature. The signed modified token 105 becomes a first representation of an access token from the IdP that can be used to access the RP. The IdP returns the signed modified token 105 (i.e., the first representation of the access token) to the user.

Once the user receives the signed modified token 105 from the IdP, the user can proceed to restore (i.e., unblind) the signed modified token 105 (i.e., the first representation of the access token) to a signed original token 107 (i.e., the second representation of the access token). The form and transformation of the unsigned and the signed tokens (i.e., the original token, the modified token, the signed modified token, and the signed original token) are such that the validity of the IdP signature on the tokens is not disturbed by the transformation.

Having derived the signed original token 107 (i.e., the second representation of the access token), the user can then proceed to present the signed original token 107 (i.e., the second representation of the access token) to the RP to gain access at the RP. In some implementations, when the user approaches the RP via a proxy server or similar mechanism that hides the network location of the user, anonymous access is achieved. In some implementations, the user can dynamically choose to access the RP pseudonymously by offering proof of possession of a pseudonym 109 previously registered with the RP. In some implementations, the choice of pseudonymous access is based on a service agreement between the RP and the user (e.g., use of a pseudonym associated with a service account of the user).

If the IdP signature is only verifiable by the IdP, then the RP presents the signed original token 107 (i.e., the second representation of the access token) to the IdP to verify the validity of the access token. The IdP can verify that the signed original token 107 is a valid access token; however, the IdP has no ability to link the signed original token 107 to any token previously signed by the IdP or to any particular user's pseudonym.

Once the RP receives verification from the IdP that the signed original token 107 is a valid access token, the RP can grant access to the user (or allow activities analogous to access to the user). If the IdP signature is a publicly verifiable signature, the RP can verify the validity of the signed original token 107 locally, and grant access to the user once the verification goes through. When the user has employed pseudonymous access, the RP also verifies the user's proof of possession of a pseudonym 109 previously registered with the RP. In some possible implementations, the user demonstrates possession of the pseudonym established at the RP by cryptographic means. If both the validity of the access token and the possession of the pseudonym are successfully verified, the RP can proceed to grant access to the user.

Figure 2:
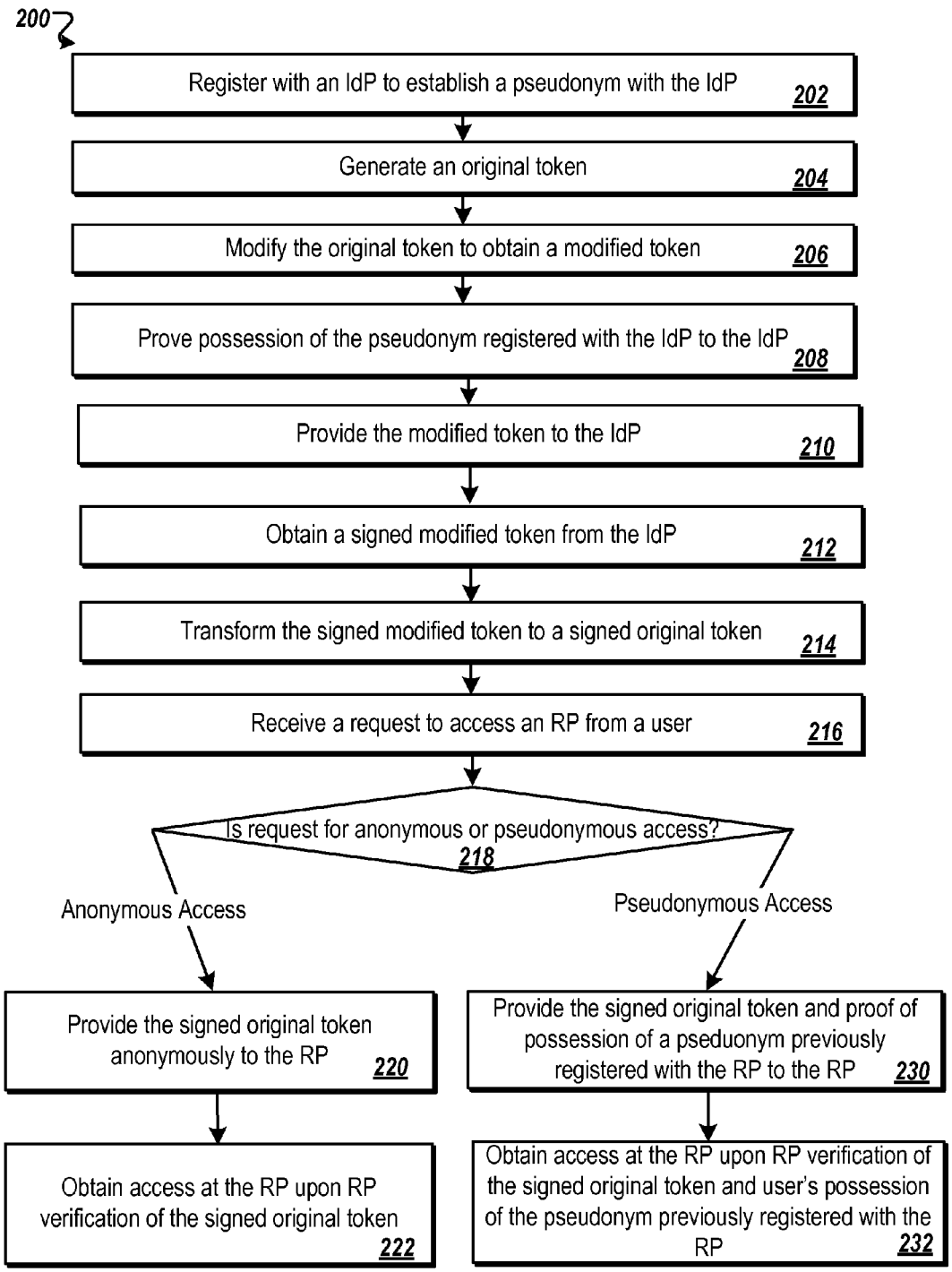
FIG. 2 is a flow diagram of an example process utilized by a user in the system shown in FIG. 1 to gain access at the RP.

The basic system described in FIG. 1 supports impromptu user-selected anonymous or pseudonymous access at an RP. This flexibility is not present in any previously proposed pseudonym systems in the art that utilize blind signatures. FIG. 2 is a flow diagram of an example process 200 utilized by a user 102 through its agent 100 in the system to gain access at an RP in accordance with the configuration and protocol shown in FIG. 1.

First, the user registers with an IdP to establish a pseudonym with the IdP (202). This initial registration with the IdP can be accomplished through a different session from the session in which the following steps occur. The user can similarly register with an RP to establish a different pseudonym with the RP. The pseudonym registered with the IdP and the RP are unlinkable to each other by the RP or the IdP, either individually or colluding.

To gain access at the RP, the user first generates an original token (204). This original token can be a fixed format token or a free format token. The original token can include (but not necessarily directly represent) some semantics. The semantics can include information such as the RP's identifier (e.g., RP name), the IdP's identifier (e.g., IdP name), and/or any other information (e.g., a timestamp). The original token can also encode (but not directly represent) token properties, such as a lifespan or a number of uses, for the token. The original token can also encode (but not directly represent) access authorization information and/or selective disclosure of user properties that the user wishes the IdP to confirm on behalf of the RP. The above indirect representations may be achieved in some implementations using cryptographic functions, for example.

In order to prevent the IdP from tracking the use of this original token and linking it to the user, the user modifies the original token to obtain a modified token (206). This is a token blinding process. The transformation from the original token to the modified token prevents the IdP from restoring or linking the modified token to the original token. When presented with either one of the original token or the modified token, the IdP is not able to derive the other without a secret key held by the user.

To obtain IdP's confirmation, the user offers proof of its possession of the pseudonym previously established with the IdP to the IdP (208). The user also provides the modified token to the IdP (210). The user can send the modified token to the IdP along with or as part of the proof of possession of the pseudonym. Alternatively, the proof and the modified token can be provided separately. The user can prove possession of the pseudonym in a number of ways, e.g., by a zero knowledge proof, by signing, or by decrypting a challenge. In some implementations, the user can also offer proof that the original token of a particular structured that the user and the IdP have agreed upon.

Once the IdP is satisfied with the user's proof of possession of the pseudonym and verifies the access authorization and/or the user properties that are to be confirmed, the IdP digitally signs the modified token and returns the signed modified token to the user. The signed modified token is a first representation of an access token from the IdP. The user receives the signed modified token from the IdP (212). The user then transforms or restores the signed modified token to obtain a signed original token while preserving the validity of the IdP's signature on the signed original token (214). The signed original token is a second representation of the access token from the IdP. This transformation is the token unblinding process. Various cryptographic methods can be implemented to achieve possession of a signed token that is unlinkable in its second representation (i.e., unblinded state) to the first representation (i.e., blinded state) previously presented to the IdP.

At this point, the user can choose to access the RP anonymously or pseudonymously using the signed original access token (216 and 218). Typically, the user agent 100 as shown in FIG. 1 (e.g., a pseudonym software or device interface between the user and the online service/content providers) receives the user's request for accessing the RP (216), and the request indicates whether the user wishes to access the RP anonymously or pseudonymously. In some implementations, the user agent 100 can also store a default setting for the user and/or for that particular RP to indicate whether the access is to be anonymous or pseudonymous.

If the request is for accessing the RP anonymously, the pseudonym software or device provides the signed original token anonymously to the RP (220), and gains access to the RP upon RP's verification of the signed original token (222). The anonymous access at the RP is not linkable to any previous or future user access at the RP or to any user's pseudonym registered with the IdP.

If the request is for accessing the RP pseudonymously, the client device provides the above signed original token and an additional proof of possession of a pseudonym previously registered with the RP to the RP (230). The user gains access to the RP upon RP's verification of the signed original token and the user's possession of the pseudonym that the user has previously registered with the RP (232).

The pseudonymous access at the RP is linkable to the pseudonym that the user previously registered with the RP, but is not linkable to any user's pseudonym registered with the IdP. Further, the pseudonymous access is not linkable to any previous or future user access at the RP that are not associated with the pseudonym that is used for this particular pseudonym access at the RP.

In a variation of the system and protocol presented with respect to FIGS. 1 and 2. A user can obtain an access token from an IdP without having to first provide an original token (as described with respect to FIGS. 1 and 2) to the IdP. In such implementations, the user first obtains a pseudonym from an IdP in an initial session. In a subsequent session, the user proves possession of the pseudonym to the IdP (e.g., by signing onto the IdP using the pseudonym). If the IdP is satisfied with the proof of possession of the pseudonym, the IdP provides an access token to the user. The access token encodes confirmation of access authorization and/or selective disclosure of user properties that the user can use for accessing an RP. The access token provided by the IdP is in a form such that a particular transformation on the access token does not destroy the validity of the access token but makes the transformed access token unlinkable to the un-transformed access token.

Then, in order to prevent the IdP from tracking the user's use of this access token at the RP, the user transforms the access token in such a way to preserve the validity of the confirmation of access authorization and/or selective disclosure, whilst making the transformed access token unrecognizable to the IdP.

At this point, the user can choose to access the RP anonymously (or pseudonymously) using the transformed access token. For pseudonymous access, the user also needs to provide proof of possession of a pseudonym previously registered with the RP. In some implementation the user does not present the signed transformed access token directly to the RP but rather proves in zero-knowledge that it holds such a signed token (e.g., by presenting not the signed token, but an encryption of the signed token instead).

The system described herein supports flexible modes such as user-selected anonymous and pseudonymous access and publicly verifiable and privately verifiable credentials. Complete anonymity is not always a requirement of the unlinkability. The flexible access modes are advantageous feature of the system because sometimes a user may wish to keep some access at an RP anonymous while keeping others linkable to a particular pseudonym previously registered at the RP. Note further that the user can access the RP via a proxy server, and therefore conceal clues of the user's identity (e.g., user's IP address and routing information, and so on) from the RP.

An Example Implementation of the Basic System and Protocol

IdP Site Setup

An IdP verifies user access authorization on behalf of RPs (e.g., online service or content providers over the Internet) and/or provides selective disclosure of user properties to the RPs. The IdP can itself be a service or content provider that holds certain user information. The IdP can obtain the user information through user registration (sometimes with verification documents from other authorities). An example IdP can be an email service provider that already possesses some information of a user through the registration process. The application of systems and protocols disclosed in this specification is not limited to access to Internet services. The systems and protocols can also apply to other processes that allows a third party (IdP) to manage users and to further allow users to access other entities (RP's) under privacy constraints. The systems and protocols apply to inter-organizational and cross-organizational access management where user privacy with respect to part of the entire system is of concern.

The registration at the IdP can be accomplished through a pseudonym system utilizing public-key cryptography. The IdP can also provide verifiable signatures to a user using techniques of public-key cryptography. In some implementations, the IdP can provide privately verifiable signatures that can only be verified by the IdP itself. For example, the IdP can set up a secret key (k)-public key ($g^k$) pair, where k is a random exponent from the multiplicative group integers modulo p $\{Z^*_q\}$, where q is a large prime number, p=2q+1 is a strong prime, and g is a canonical generator of $\{Z^*_p\}$ with order q (i.e. g is a quadratic residue generating the subgroup of quadratic residues represented mod p). A site generator can be generated from the canonically chosen generator g in that sub-group of quadratic residues, raised to a power that is generated by applying a cryptographic transformation with a private key over the site identifier (e.g., the Uniform Resource Locator (URL) of the RP's or the IdP's website). For example, $g^{\{E(URL)\}}$ is the site generator, where URL is the site identifier and E is an encryption with a private key of the user of that identifier. The encryption can be a standard Advanced Encryption Standard (AES) method in some mode of encryption. This method takes a canonical generator and modifies it into a site-specific generator.

The IdP can provide an IdP signature Sign(m, k)=(m, $m^k$), where m is a message that is signed by the IdP, and $m^k$ is the signed message, and the exponent k is the secret key of the user, and all exponentiations are always modulo p.

To privately verify a signature (u, v), the IdP with the public key $g^k$ can determine whether $\log_u(v)=\log_g(g^k)$, namely that k was the exponent in both the public key ($g^k$) and the purported signed message v. If the equality holds, then the IdP can verify that signature (u, v) is a valid signature by the IdP. If u is given in a form of $g^x$ (namely u is a modified canonical generator raised to the power of x), where x is a secret key of a user, then the IdP must verify whether $v=g^{kx}$, which can be done by the IdP and shown to others in a zero-knowledge fashion (i.e., without revealing the value of x). In general, a pseudonym system on the IdP site, the RP site and the user generators is based on a mathematical system in which the Decisional Diffie-Hellman (DDH) problem is hard to solve. This requirement implies that the discrete logarithm is a hard problem, i.e., it is hard to derive the value of x from $g^x$ with only knowledge of g. The above verification of a signature without the IdP's involvement will amounts to solving a DDH problem.

User and RP Site Setup

The user site can include a client device that is used by a user to access the IdPs and the RPs. In some implementations, a user site software component can run on the client device that provides an interface between the user and the IdPs and RPs. The operation of the user site software can be partially or completely transparent to the user. The client software can utilize a pseudonym system that relies on public-key cryptography.

The user site can set up a user secret key (r)-public key ($g^r$) pair, where r is a random exponent from the group $\{Z^{*q}\}$, where q is a large prime number, g is a site generator of the quadratic residues $\{Z^*_p\}$, where p=2q+1 is a strong prime. The canonical site generator g for the user site can be global to all users or per user choice.

If the client wishes to access an RP pseudonymously, the client first registers a pseudonym with the RP. A user can register several different pseudonyms with the same RP (e.g., for accessing the RP for different purposes).

The pseudonym system used by the user can create an RP-specific secret key s, and an RP-specific site generates $G=g^s$, where g is a global canonical site generator. The user can provide an RP specific signature (G, G$^r$), where r is the user's secret key (the same r as referred to above) for the user site and G is the RP-specific site generator. The user then registers the RP-specific (i.e., non-canonical but specific) site generator G and the signature (G, G$^r$) with the RP as one of its pseudonyms at the RP. The user can prove its knowledge of the RP specific secret key s to the RP in zero-knowledge fashion (i.e., without revealing s to the RP). Proving $\log_g(g^r)$ $=\log_G(G^r)$ is computationally equivalent to solving a DDH problem, and can therefore only be practically done by the user who has knowledge of the secret key r. The user can generate multiple RP-specific secret keys and site generators to register multiple pseudonyms at the RP. The user can also generate different RP-specific secret keys and site generators to register with different RPs. In addition, the user can derive s, the RP specific secret key that determines G from a cryptographic key applied to the identifier of the RP (as exemplified above with the encryption of the URL). This allows a system of pseudonyms based on various base elements G's that are derived cryptographically (e.g., a Media Access Control (MAC) address or an encryption with AES) from names of RP sites.

The structure of the pseudonym registered at the RPs is such that it enables zero-knowledge proof of the secret exponent by the user (i.e., as an authentication of possession of the pseudonym). The structure of the pseudonym also enables digital signatures (e.g., ElGamal signature) to record use of the pseudonym. The structure of the pseudonym can further be used for decryption (e.g., of ElGamal-encrypted ciphertext) in a challenge response system or as part of encrypted communications. The decryption can also support DH key-exchange. For example, two parties (the client device and the RP) with claimed pseudonyms can perform two DH key-exchanges. During each of the two DH key-exchanges, the pseudonym of one side is used as the long-lived DH key. The keys in the two key-exchanges can be combined together (e.g., ex'ored) to give a forward secure key. This allows past signatures to remain secure even if a current secret key is leaked. The user can register a number of pseudonyms using this protocol and can easily replace pseudonyms.

Blind Signatures

In order to modify an initial value y (e.g., an original token) such that it can be signed by the IdP without IdP knowing the content of the value y (e.g., the original token), the value y (the original token) can be "blinded" before it is sent to the IdP for signature.

For example, in order to obtain a blind signature on the value y, the user can choose two random exponent b and c from the group $\{Z^*_q\}$. The client device then computes a blinded message m (i.e., a modified token based on the original token) as follows: $m=y^b g^c$. The value of y is therefore concealed from the IdP because it is computationally difficult to derive the value of y from m. The blinded message m (i.e., the modified token based on the original token) can be sent to the IdP for signature.

Signing

Once the blinded message $m=y^b g^c$ (i.e., the modified token based on the original token) is sent to the IdP and the IdP verifies the necessary access authorization and selective disclosure for the user, the IdP signs the blinded message as $m^k=y^{bk} g^{ck}$. The signed modified token $m^k$ can be returned to the user in the form of a first representation of an access token (m, $m^k$) from the IdP. $g^k$ is the public key of the signer IdP. All exponents are modulo p.

Unblinding

Once the signed blinded message $m^k=y^{bk} g^{ck}$ (i.e., the signed modified token) or the first representation of the access token (m, $m^k$) from the IdP is received by the client device from the IdP, the user can compute $g^{-ck}$ (since the user has knowledge of the random exponent c and the IdP's public key $g^k$) to obtain $y^{bk}=m^k g^{-ck}$. The user can then computes $y^k=(y^{bk})^{(1/b)}$ (since the user has knowledge of the random exponent b). Since $y^k$ is a valid signature on only the value y, the user successfully obtained a signed original token $y^k$, and hence a second representation of the access token from the IdP (y, $y^k$). At this point, the IdP has no information on the value y (the original token) during the entire signing process.

Client Getting an Access Token from the IdP

In some implementations, the client device generates the original token y that is turned into an access token (y, $y^k$) and used for accessing an RP. This access token is a privately verifiable signature by the holder of the private key k. The original token y is generated cryptographically from a string of information x. The original token can be RP-specific or a general token applicable to all RPs. The format and content of the original token that is supported by the pseudonym system in accordance with the system disclosed in this specification are discussed in further detail in sections that follow.

Figure 3:
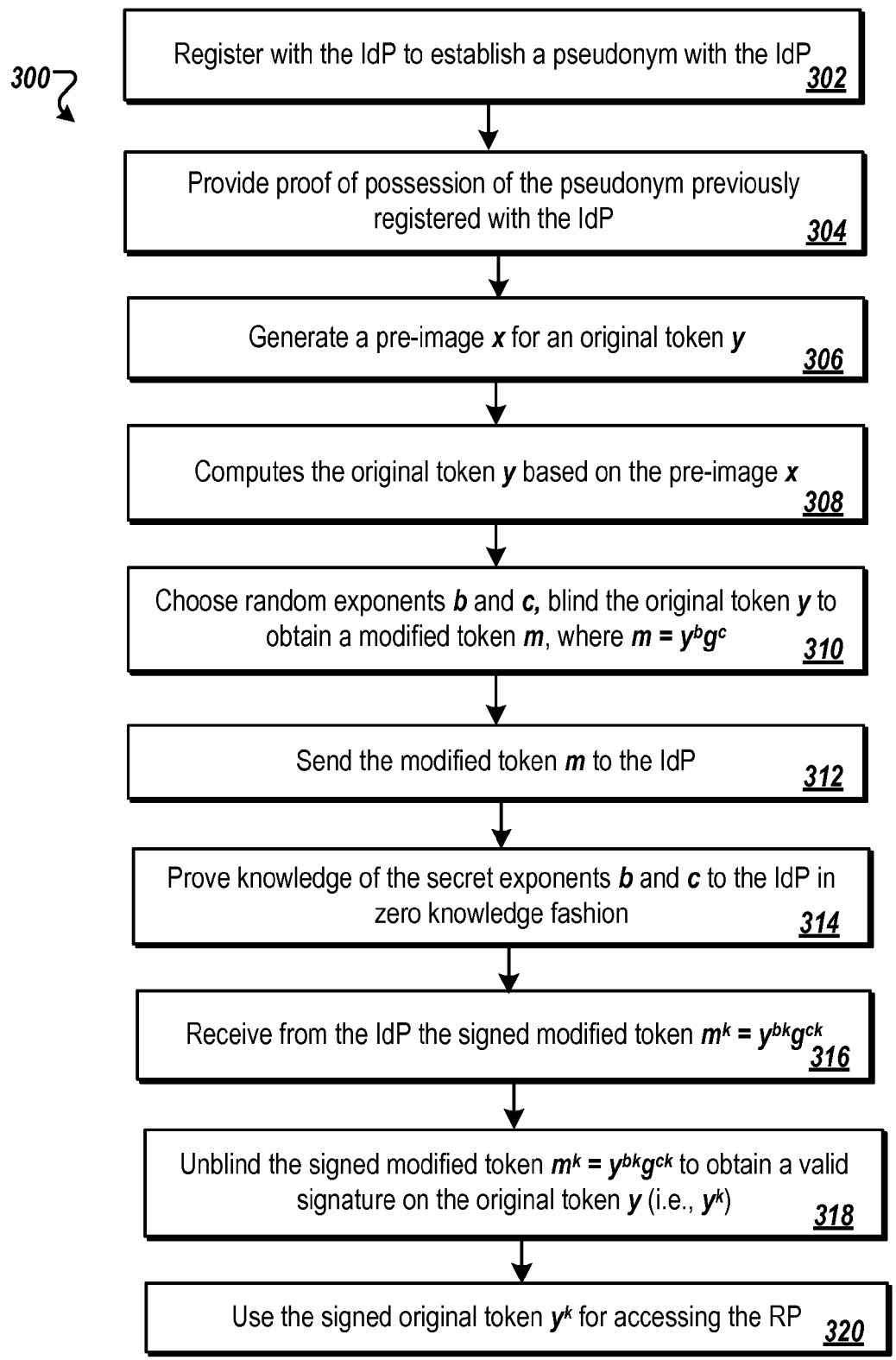
FIG. 3 is a flow diagram of an example process utilized by a user to obtain an access token from an IdP to gain access at an RP.

FIG. 3 shows an example process 300 for a user to obtain an access token from an IdP to use at an RP. The client first generates a pre-image x for an original token y, where x can have any arbitrary or user-selected value (306). The systems and protocols disclosed in this specification support both fixed-format information fields and free-format information fields as the pre-image x (or part of x). A fixed-format pre-image consists of specific pieces of information stored at particular portions of the pre-image string, and/or according to a specific format. In contrast, a free-format pre-image can contain any information that the user chooses to include, at any location in the pre-image string, and in any format that is understandable by an intended recipient. A free-format pre-image can also be of any practical size.

The client device then computes the original token y based on the pre-image x (308), where y=F(x), and F is a one-way function (e.g., a hash function). Then, the client device chooses random exponents b and c and blinds the original token y to obtain a modified token m, where the modified token $m=y^b g^c$ (310). The client sends the modified token m to the IdP (312), and provides a zero-knowledge proof to the IdP that it knows the client secret exponents b and c corresponding to modified token $m=y^b g^c$ (314). The IdP then signs the modified token m, and returns the signed modified token $m^k=y^{bk}g^{ck}$ (e.g., in the form of a first representation of the access token (m, $m^k$) from the IdP) to the client device. The client device receives from the IdP the signed modified token $m^k=y^{bk}g^{ck}$ (e.g, in the form of a first representation of the access token (m, $m^k$) from the IdP) (316). The client device then unblinds the signed modified token $m^k=y^{bk}g^{ck}$ to obtain a valid signature only on the original token y (e.g., in the form of a second representation of the access token (y, $y^k$) from the IdP), using its knowledge of the random exponent b and c, and the IdP's public key $g^k$ (318). The client can then use the signed original token $y^k$ (e.g., in the form of the second representation of the access token from the IdP) for accessing the RP (320).

In some implementations, the IdP provides confirmation of access authorization and/or selective disclosure of user property only after the IdP has received successful proof of possession of the pseudonym that the user has registered at the IdP. In such implementations, the user first registers with the IdP to establish a pseudonym with the IdP (302). When the user is ready to request the access token from the IdP for accessing an RP, the user first provides proof of its possession of the pseudonym previously registered with the IdP (304). The proof of possession of the pseudonym can be done in a variety of ways. For example, the proof can be done using a zero knowledge proof, by signing a message, or by interactively decrypting a challenge from the IdP. In some implementations, the user sends the modified token m to the IdP as part of the proof submitted to the IdP. For example, the user can compute a value o=F(m), and sign it as $o^r$, where F is a one-way function (e.g., a hash function), r is the user's secret key, and m is the modified token that is to be signed by the IdP. The user can send (o, $o^r$) to the IdP, and the IdP can verify the user's signature (o, $o^r$) and hence the user's identity through private signature verification protocol (i.e., confirming the equality $\log_g(g^r)=\log_o(o^r)$).

Client Access at the RP using the Access Token

The systems and protocols disclosed in this specification support both anonymous and pseudonymous access at a particular RP or different RPs. The user can choose to keep some accesses anonymous while associating other accesses with particular pseudonymous that the user has previously registered with the RPs. The access mode (i.e., anonymous or pseudonymous access) can be selected by the user at the time of making the actual request for access at the RP. This user-selected flexibility is a desirable feature of the disclosed systems and protocols that is not available in third-party-mediated access authorization systems in the prior art. This user-selected pseudonymous or anonymous access can be useful when, for example, a user wishes to keep a record of certain accesses on the RP that would be counted towards reward points of some incentive programs, while keeping anonymous other accesses that do not reap such benefits. The user software may utilize a proxy that has the task of hiding routing information about the user (e.g., hiding the IP address of the user machine). The proxy is an additional component for maintaining anonymous access.

Figure 4:
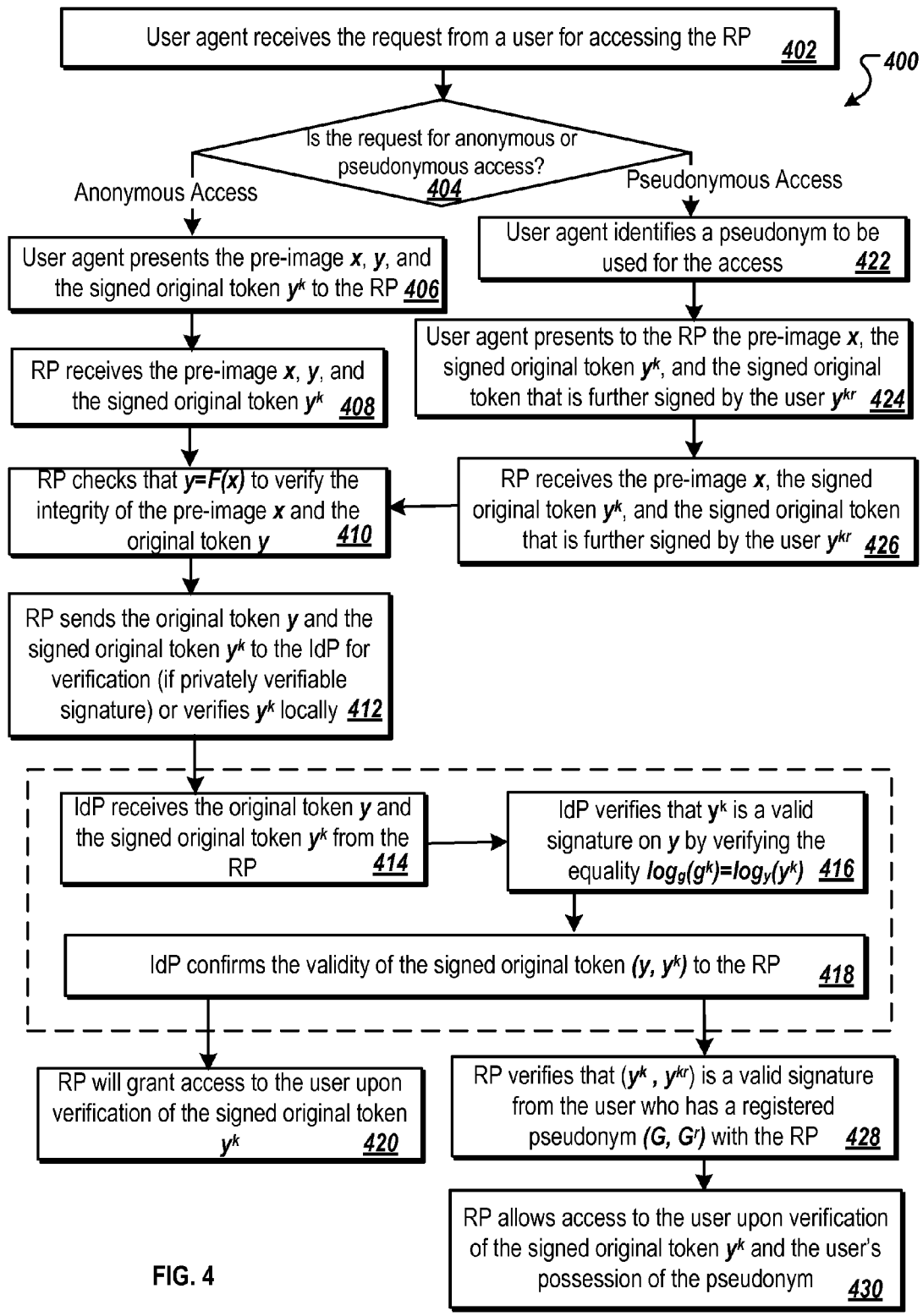
FIG. 4 is a flow diagram of a more detailed example process for user-selected anonymous or pseudonymous access at an RP.

FIG. 4 is a flow diagram of an example process 400 for user-selected anonymous or pseudonymous access at an RP. First, a user initiates a request to access an RP through a user interface on the client device (i.e., a user agent). The user agent receives the request from the user for accessing the RP (402). The user agent determines whether the request is for accessing the RP anonymously or pseudonymously (404). The determination can be based on a user instruction in the user's request, or some default setting previously set up by the user, or the requirement by the RP. Once the user agent determines the mode of access (i.e., anonymous or pseudonymous), then the user agent can proceed to contact with RP with the access token.

If the request is for accessing the RP anonymously, then the user agent presents at least the pre-image x, and the signed original token y, and $y^k$ to the RP (406). The user agent does not provide any reference to any pseudonym in the access request.

The RP receives the pre-image x and the signed original token y, and $y^k$ from the client device (408). The RP checks that y=F(x) to verify the integrity of the pre-image x and the original token y (410). RP verifies the semantics and various values in x. If the signature used by the IdP is a privately verifiable signature, the RP sends the original token y and the signed original token $y^k$ (e.g., in the form of the second representation of the access token (y, $y^k$)) to the IdP for verification (412).

The IdP receives the original token y and the signed original token $y^k$ (e.g., in the form of the second representation of the access token (y, $y^k$)) from the RP (414). Because the original token y was blinded and presented to the IdP as $m=y^b g^c$ when IdP first signed the modified token m, the IdP cannot link the original token y or the signed original token $y^k$ to the modified token m or the pseudonym of the user that was used to obtain the signature. The IdP verifies that $y^k$ is a valid signature on y by verifying the equality $\log_g(g^k)=\log_y(y^k)$ (416) and confirms the validity of the second representation of the access token (y, $y^k$) to the RP (418).

Once the RP verifies that the signature on the original token is a valid signature from the IdP, the RP will grant access to the user due to the confirmation of access authorization or selective disclosure provided by the IdP in the signature (420).

If the request is for accessing the RP pseudonymously, the user agent first identifies the pseudonym to be used for the access (422). An example implementation for setting up an RP-specific pseudonym is disclosed under the section "User and RP Site Setup."

When accessing the RP pseudonymously, the user agent also presents to the RP the pre-image x, the signed original token $y^k$, and it can include the signed original token that is further signed by the user $y^{kr}$ (424). The pair ($y^k$, $y^{kr}$) is a privately verifiable signature based on the pseudonym previously registered at the RP (i.e., (G, G'), where G is an RP-specific site generator, $G=g^s$, s is a RP-specific secret key (e.g., derived from RP's identifier), and g is a global canonical site generator. In some implementations, the proof of possession of the secret exponent r is carried out interactively between the client device and the RP. The user can reuse the signed original token $y^k$ for access at the same RP or different RPs (for example, by changing the secret key s).

The RP receives the pre-image x, the signed original token y, $y^k$, and the signed original token that is further signed by the user $y^{kr}$ (426). The RP and the IdP perform the same verifications of the pre-image x, the original token y, and the signed original token $y^k$ as in the anonymous access situation described above (steps 410, 412, 414, 416, and 418). The RP also verifies that ($y^k$, $y^{kr}$) is a valid signature from the user who has a registered pseudonym (G, G') with the RP (428). Once the RP verifies the validity of the signed original token $y^k$ either locally or through the IdP, and the user's possession of the pseudonym previously registered at the RP, the RP allows access to the user (430). For pseudonym accesses by the user, the RP can keep a record of the user's accesses and associated transactions with reference to the pseudonym that is used by the user for the accesses.

In some implementations, the access tokens distributed by the IdP are limited-uses tokens or short-lived tokens. In such implementations, the IdP also performs checks to see if the signed original token has been used before, or if the life-time (or number of uses) of the signed original token has been exhausted. For example, the life-time (or number of uses) of a signed token can be encoded in a particular signature scheme that is used to sign the tokens. If any check is not passed, the IdP denies the validity of the access token that is presented for verification.

Publicly Verifiable Signatures

In some implementations, if the signature scheme used by the IdP is a publicly verifiable blind signature, the RP can verify the signature locally without going to the IdP for verification. An example of a publicly verifiable blind signature scheme is Chaum's blind signature. More information on Chaum's blind signature is discussed in Mihir Bellare, Chanathip Namprempre, David Pointcheval, Michael Semanko: *The One-More-RSA-Inversion Problems and the Security of Chaum's Blind Signature Scheme. J. Cryptology* 16(3): 185-215 (2003).

For example, the IdP can employ Chaum's RSA-based blind signature with Full Domain Hash (FDH), with a public key <N, e>, and a private key <N, d>, where N is the product of two large prime numbers, P and Q, and is used as the modulus for both the public key and the private key; $d=e^{-1} \mod(\Phi(N))$, where $\Phi(N)=(P-1)(Q-1)$, assuming N>p slightly.

When publicly verifiable signatures are employed by the IdP, the user agent generates the pre-image x, and an original token y=FDH(x), where FDH is a full domain hash function applied to $\{Z_n\}$ (namely a hash function from the domain to itself as a one-to-one function, or at least an approximately one-to-one function). The user blinds the original token y to get a blinded message (i.e., the modified token) $m=FDH(y) a^e$, where a is a random value chosen by the client device. The client device sends the blinded message (i.e., modified token) m to the IdP, and the IdP signs the blinded message (i.e., modified token) m and sends back $m^d$ (mod N). The user agent unblinds the signed blinded message (i.e., the signed modified token $m^d$) and obtains a signed original token $y^d$ by computing $m/a=[FDH(y) a^e]^d/a=(FDH(y))^d$. Given knowledge of the IdP's identity and the IdP's public signature scheme, the RP can verify the validity of the signature $[FDH(y)]^d$.

The flexibility of the systems and protocols disclosed in this specification to support both publicly verifiable and privately verifiable signature schemes of IdPs allows the client device to interact with IdPs that employ different signature schemes, supports different business arrangements, and thus encourages wider adoption of the systems and protocols by the IdPs and the RPs. Different business models for verification of pseudonyms can be accommodated because the RP can be allowed to check the signatures locally or be required to go to the IdP to check the signatures.

A Semantic-Rich Access Token

The systems and protocols disclosed in this specification support the use of a semantic-rich, free-format token (e.g., the pre-image x of the original token y) when accessing an RP.

The pre-image x of the original token y can encode information that the user wishes to communicate to the recipient of the pre-image x. For example, the pre-image x can include an RP identifier (e.g., RP name) for an RP-specific token. The RP can check the portion of the pre-image x for its name to ensure that it is the intended recipient of the access request from the user. The RP name included in the pre-image x can also be useful when the user wishes to disable some tokens associated with specific RPs, but keep the tokens for other RPs. The pre-image x can also include semantics for various characteristics of the tokens derived from the pre-image x, e.g., the lifespan and/or the number of uses permitted for the token generated from the pre-image x. The RP can check that the token y generated from the pre-image x has not been used before if the pre-image x is for a one-time token, or that the lifespan or number of uses of the token has not been exhausted.

It is acceptable in pseudonymous access that the use of a pre-image x is linkable to previous uses of the same pre-image x in accessing the same RP. The same pre-image x can be use to generate tokens that are used at a number of different RPs, if the user requests for different credentials (signature or signature schemes) from the IdP for use at different RPs.

The information encoded in the pre-image x can be plainly viewable, or encrypted. The pre-image x can also include portions that contain random values. The format of the pre-image x does not have to be fixed, and can be variable if the user so chooses. The function F can be a one-way hash function that compresses any variable-length input to a fixed-length result.

One type of possible enhanced semantics in the pre-image x is "a pseudonym" that is embedded in x. In this type of implementations, the RP requires that the user embed in the pre-image x a pseudonym that is of the same type as the pseudonym the user has previously registered with the RP. When the user tries to gain access at the RP pseudonymously, the user needs to prove to the RP that the embedded pseudonym in the pre-image x is of the same type as the one being used to gain access at the RP. The binding of the "pseudonym" to an access token can prevent an authorized user from transferring the access token to an unauthorized user, since this transfer means that the authorized user has to transfer its "pseudonym" which is a long-term "identity" of the authorized user in order for the transferred access token to be of any use to the unauthorized user.

Another type of possible enhanced semantics in the pre-image x is a second pseudonym that is embedded in x for the purpose of token revocation. The second pseudonym can be in the form of $<V, V^{sf}>$, where $V=H^t$, $<H, H_{sf}>$ is a pseudonym of the user, sf is derived from another one-way function (e.g., a second MAC key) used by the user, and t is a random value derived from this one-way function (e.g., the second MAC or AES key) and the identity of the site and/or the token. The second pseudonym $<V, V^{sf}>$ can be used to tag the pre-image x. The user can subsequently revoke the pre-image x containing the second pseudonym $<V, V^{sf}>$ by revealing the secret exponent sf to the RP. For example, the RP that receives a pre-image x from a user can check whether the pre-image x contains the second pseudonym that has an exponent sf. If the pre-image x does contain the second pseudonym that has an exponent sf, then the access token derived from the pre-image x is rejected, and the user's access request is denied.

Selective Disclosure of User Properties

The systems and protocols disclosed in this specification support selective disclosure of user properties by an IdP to an RP. In some implementations, the IdP possesses verified information about various properties of a user, such as age, gender, membership of certain organizations, professional affiliations, and so on. Some of this information may be relevant for the user's eligibility to access a particular RP site, for example, age is a user property that is relevant for the user's eligibility to access an adult website or a youth-only online community. The IdP can selectively disclose partial information about these user properties, such that the IdP only provides confirmation of the bare minimum that the RP would require for user access. For example, instead of providing the exact age of the user, the IdP can provide confirmation to the RP that the user is within the age range eligible for accessing the RP site.

Selective disclosure of user properties can be implemented using the access token in accordance with the systems and protocols disclosed in this specification. In some implementations, the selective disclosure is implemented using different signature schemes (e.g., using different secret keys) that are used to sign the blinded/modified tokens. Each signature scheme can correspond to a confirmation or denial of a particular property associated with a user. For example, one signature scheme can mean "over 18 years old," while another signature can mean "over 13 years old." Both of these two signature schemes can be used on an access token granted to the same user depending on the RP's requirement for access and the user's actual age known to the IdP. In some implementations, the IdP has prior knowledge of the RP's requirements.

Because IdPs typically only need to attest to a limited number of user properties in accordance with some well-defined rules in the access policies of the RPs, the IdPs only need to employ a limited number of different signature schemes (e.g., different RSA prime number secret exponents) for those limited number of user properties. For example, an IdP can store a table of possible properties with corresponding signature schemes, and will select the appropriate signature scheme when providing the confirmation of access authorization and/or selective disclosure of user properties based on the RP requirement and/or the actual user properties.

Figure 5:
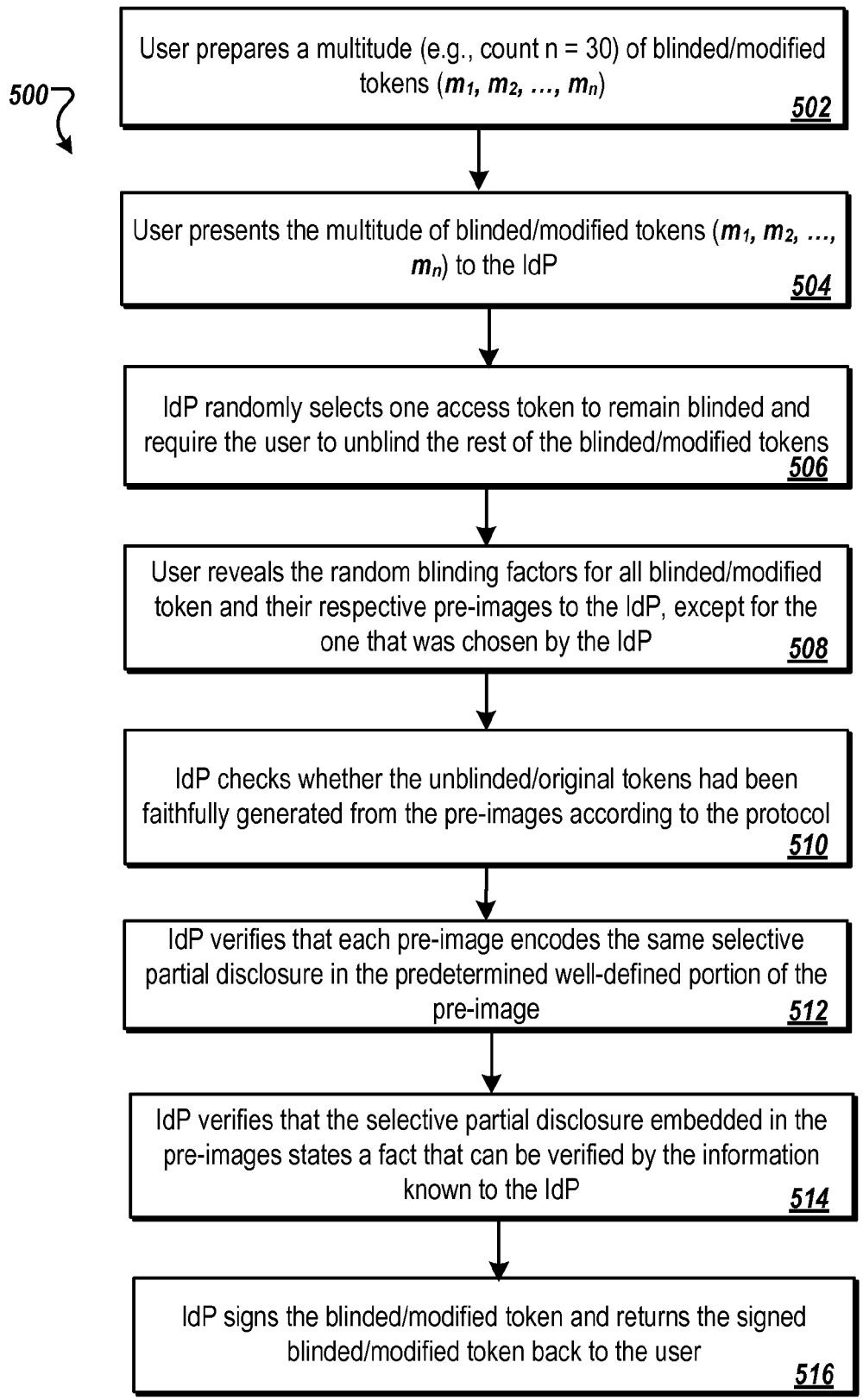
FIG. 5 is a flow diagram of an example implementation of selective disclosure using the pre-image of a token sent by the user to the IdP.

In some implementations, the requirements or the desired selective partial disclosure can be embedded in the user's request to the IdP (e.g., as a text string in a well-defined part of the pre-image x, and hence implicitly in the modified token m). FIG. 5 illustrates the interaction between a user (through a user agent such as a software component running on a client device) and an IdP in a system that implements selective disclosure using the pre-image x. In the process 500 of obtaining an access token (e.g., a signed modified token $m^k$) from an IdP, the user instead of preparing just one blinded/modified token to send to the IdP, prepares a multitude (e.g., count n=30) of blinded/modified tokens $(m_1, m_2, \ldots, m_n)$ (502). Each of these blinded/modified tokens $(m_i)$ has been created using an original token $(y_i)$, and each of the original tokens $(y_i)$ has been derived from a pre-image $(x_i)$. Each pre-image $(x_i)$ contains a well-defined portion that includes an identical selective partial disclosure that the user wishes to present to the RP for access. The user presents the multitude of blinded/modified tokens $(m_1, m_2, \ldots, m_n)$ to the IdP (504).

After the user submits the multitude of blinded/modified tokens $(m_1, m_2, \ldots, m_n)$ to the IdP, the IdP randomly selects one access token to remain blinded and require the user to unblind the rest of the blinded/modified tokens to verify that the user has faithfully encoded the same selective partial disclosure in all of the blinded/modified tokens (506).

Having received the IdP's request, the user reveals the random blinding factors (i.e., the random exponents used to blind the original tokens) for all blinded/modified token and their respective pre-images to the IdP, except for the one that was chosen by the IdP (508).

The IdP checks whether the unblinded/original tokens had been faithfully generated from the pre-images according to the protocol (510). The IdP also verifies that each pre-image encodes the same selective partial disclosure in the predetermined well-defined portion of the pre-image (512). The IdP also verifies that the selective partial disclosure embedded in the pre-images states a fact that can be verified by the information known to the IdP (514). If the IdP can successfully verify the correctness of all those blinded/modified tokens that have been opened for IdP inspection, the IdP can presume that the only remaining unopened blinded/modified token is also faithfully constructed and contains the same selective partial disclosure. The IdP then proceeds to sign the blinded/modified token and returns the signed blinded/modified token back to the user (516).

Even though there is a small probability that the only remaining blinded/modified token was not faithfully constructed (e.g., contains a different selective partial disclosure from those that have been opened), the risk associated with this small probability is tolerable for selective disclosure purposes in most situations. This risk can be further reduced if there is heavy penalty associated with the user being found to have submitted tokens that were not properly constructed according to the protocol.

If the selective partial disclosure is encoded in the pre-image x, it can be desirable that the format of the selective partial disclosure be identical across all users so that the IdP cannot discern a user's identity based on the format variations in the pre-images. The IdP can provide a standardized table of selective partial disclosure statements that a user can insert into a predetermined portion of its pre-image. The pre-image can have some other portions and at least a randomized portion. The randomized portion can be used to create the multitude of pre-images that are used to generate the different original tokens $(y_i)$, and the thus modified tokens $(m_i)$.

In some implementations, the selective partial disclosure is implemented using a special function f, namely a multiplication of generators and their exponents, where the exponents represent properties that the user possesses. For example, a set of property attributes $(a_1, a_2, \ldots a_n)$ are associated with a set of generators in a given group represented mod p: $(h_1, h_2, \ldots h_n)$, one property attribute a per generator h. A random element e is chosen for a generator $h_0$, and the token presented to the IdP is created by the following multiplication (mod p): $y = h_0^e h_1^{a1} h_2^{a2} \ldots h_n^{an}$. The user submits a multitude of $y_i$'s generated using different random element $(e_i)$. The user can prove to the IdP that $y_i$'s are faithfully constructed and the exponents $a_1, a_2, \ldots a_n$ are in use in $y_i$'s by, for example, opening all but one copy of multitude of tokens $y_i$'s submitted to the IdP. The IdP can verify the construction of the tokens, and signs the remaining unopened token. This token construction enables the user to prove in zero knowledge to the RP a selective subset of the exponents that represents the required characteristics/user properties. If the access token is one-use only then the selective subsets of the exponents are revealed and shown to be part of the token y. The user cannot cheat since the $h_i$'s are different generators and the user does not know the relative discrete log: $\log_{h_j}(h_i)$. If an access token is multi-use, the user can prove an attribute to be $a_i$ to an RP in zero-knowledge fashion. Similarly, some range properties of an attribute $a_i$ can be shown (namely that a variable $a_i$ can be smaller than one value while greater than another value).

In some implementations, it is possible to encode other information in the pre-image that are not revealed to the IdP even if the portion containing the selective partial disclosure is revealed to the IdP. For example, the different pieces of information can be encoded in different fields contained in the pre-image. More specifically, if a pre-image contains three fields (e.g., $x = f_1 | f_2 | f_3$), where $f_1$ and $f_3$ need to be revealed to the IdP for verification, but $f_2$ needs to be kept concealed, then the multitude of pre-images that are submitted to the IdP can be prepared as $x_i = f_1 | F(f_2, r_i) | f_3$, where F is a one way function with domain extension operating on any sized input (e.g., a one-way cryptographic hash function), and $r_i$ is a random value independently chosen for each of the multitude of pre-images. The user can open the blinding factors and reveal the pre-images as the IdP requests, however, $f_2$ is always concealed from the IdP during the process due to the protection of the one way function F.

User-Based Selective Linking of Pseudonyms

The systems and protocols disclosed in this specification support user-based selective linking of pseudonyms. User-based linkability is a desirable feature of the systems and protocols disclosed in this specification because sometimes a user who has been using several different pseudonyms when accessing an RP may wish to prove that all of those different pseudonyms belong to him or her. In other words, if a user is known to be associated with one particular pseudonym, he or she can choose to link other pseudonyms he or she has used to that particular pseudonym without revealing any of the pseudonyms, i.e., the user can prove linkability between pseudonyms in a zero-knowledge fashion using procedures known in the art.

For example, if the pseudonym that is known to be associated with the user is $(g, g^r)$, the user can prove that $(G, G^r)$ also belongs to him or her by proving that the two pseudonyms share a common secret exponent r. Various known methods of such proofs that keep the secret secure can be employed. Similarly, the user can deny linkability between two pseudonyms by proving that the exponents of the two pseudonyms are not the same. For example, if the second pseudonym is $(G, G^t)$ and r does not equal to t, then the user can prove in zero knowledge that the second pseudonym that does not belong to him or her. In some implementations, the user-based linkability or proof of possession of a pseudonym can be carried out by signing as well.

With user-based linkability, a user can participate in an auction/lottery and only discloses its own identity when the user wins. In such an example, the user can register two pseudonyms with the organizer/sponsor of the auction or lottery, where one is known to belong to the user (e.g., registered using the user's real identity), and the other is registered with a pseudo-identity. The user can participate in the auction or lottery using the pseudonym that is associated with the pseudo-identity, and only choose to link the two pseudonyms if he wins the auction or lottery.

User-Based Unlinkability

In some implementations, the ability to perform user-based selective linking can be deliberately removed by the user. In such implementations, the user cannot in the future link to a particular pseudonym after the linkability is erased from the user's system.

Figure 6:
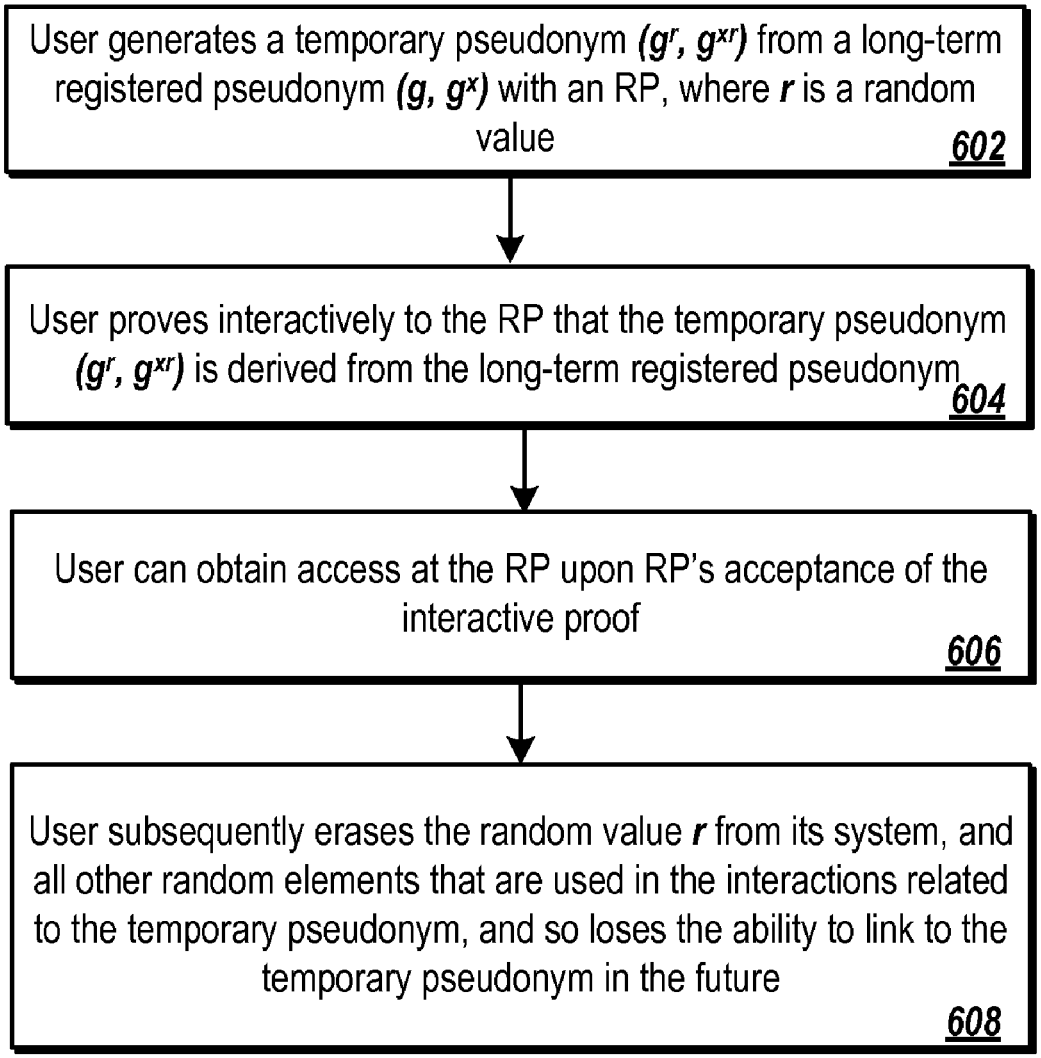
FIG. 6 is a flow diagram of an example process for a user to erase linkability between pseudonyms in a pseudonymous access.

FIG. 6 is a flow diagram of an example process 600 for a user (through a user agent such as a software component running on a client device) to erase linkability between pseudonyms. First, the user can generate a temporary pseudonym $(g^r, g^{xr})$ from a long-term registered pseudonym $(g, g^x)$ with an RP, where r is a random value (602). The user proves interactively to the RP that the temporary pseudonym $(g^r, g^{xr})$ is derived from the long-term registered pseudonym (604). In some implementations, the client device includes a script for connecting a temporary pseudonym with any pseudonym of the user. The RP accepts the proof that the temporary pseudonym $(g^r, g^{xr})$ is derived from the long-term registered pseudonym $(g, g^x)$, and the user can obtain access at the RP (606). Although the user can use the temporary pseudonym itself to gain access at the RP, the temporary pseudonym is not transferable to others and be used separately from the long-term pseudonym. When the user subsequently erases the random value r from its system, and all other random coins that are used in the interactions related to the temporary pseudonym, the user loses its ability to link to the temporary pseudonym in the future (608).

User-based unlinkability is desirable because it enhances privacy when maintaining linkability is not needed or desirable. Since the systems and protocols disclosed in this specification allows the user to perform user-based selective linking or unlinking of pseudonyms, this also opens up the possibility that the user may be forced to prove linkability or deny linkability (e.g., by court order or illegal force). Therefore, user-based unlinkability is useful under some circumstances. The systems and protocols disclosed in this specification allow the user to choose the mode of operation, either to preserve the user-based linkability and denial of linkability, or to erase that ability completely after the pseudonymous access using the temporary pseudonyms.

User-Based Revocation

The systems and protocols disclosed in this specification also support user-based global revocation of pseudonyms and credentials (e.g., access tokens).

For example, the user may share his private key with a number of trusted authorities (e.g., credential escrow authorities), such that they can jointly discover the user's credential and revoke it. In an extreme situation where the user's identity is escrowed and can be used to retrieve the user's secret keys when the user loses his secret keys. The user can distribute his/her secret keys to the authorities who can collude to recover all the secret keys. In some situations, not all authorities are required to participate in recovering all the secret keys (e.g., a subset or quorum of the authorities may suffice). The key distribution involves proving in zero-knowledge that the sharing among the authority is correct, employing methods known in the art. With privately verifiable signatures, the RP can present the credential associated with the user, and if the IdP already has the secret key, the IdP can recognize that the credential has been revoked. In some implementations, using short-lived keys may imply that revocation is not necessary.

An Example Pseudonym Generation System

The systems and protocols disclosed in the specification can support multiple IdPs and multiple RPs. To avoid having to store a key for every RP, the user can drive an RP-specific key for each RP site from some additional key t.

For example, t is the master derivation key, S is a public RP or IdP identifier (e.g., the name or URL of the IdP or RP), and F is a one-way function (e.g., a MAC function). Using the secret master derivation key t and the site identifier S, a site-specific key s can be derived, $s=F(t, S)$, where s is the exponent per site that was referred to in previous sections. In some implementations, S also includes some semantics to allow a user to have more than one pseudonym associated with an RP site. In some implementations, the user employs more than one generator and more than one one-way function, as long as the user is consistent in the usage of the generators. Note that F can be a MAC function or an encryption function.

This pseudonym generation system allows an unlimited number of pseudonyms to be created from a constant number of cryptographic keys. Thus, the user device does not have to keep an unlimited number of secrets at the same time. Further, the amount of storage in the client device is not a function of how many locations the user visits and how many pseudonyms he actually possesses with these locations. In some implementations, only a constant number of cryptographic secrets are held by the client. The site-specific keys can be used to modify a canonical generator to create a site-specific generator. In some implementations, only a small/short key is needed, which enables implementation of the user agent on devices with substantial memory constraints (e.g., a handheld or mobile device).

In some implementations, the pseudonym generation system can generate a large number of pseudonyms for establishing respective pseudonymous identities with a large number of entities. The pseudonyms are generated by the pseudonym system based on at least one of a fixed number of cryptographic keys. The generated pseudonyms are unlinkable to one another by entities that do not possess the cryptographic key. The user can register each of the pseudonymous identities with a respective entity using a corresponding pseudonym. The pseudonym system can later reproduce and prove user possession of each pseudonymous identity without maintaining a persistent copy of the corresponding pseudonym, either on the pseudonym system or at any other storage locations.

The pseudonym generation system can be used for pseudonym-based accesses to Internet services employing, for example, web based protocols, as well as other electronic transaction services in a computer communication networks with improved level of user privacy. A user can choose different pseudonyms at different service providers based on his criteria such as "different name at different provider" or "different names at different geographic locations" and so on.

Computations Needed of the Systems and Protocols

The systems and protocols disclosed in this specification can be implemented using systems including cryptographic software and hardware with crypto-processing (exponentiations, hashing, Mac-ing, encryption, signing, zero-knowledge proofs) at the parties. The cryptographic processing needed in the systems is efficient and minimal, and is available in many existing software packages, such as common web browsers, Java libraries and so on.

The systems are implementable based on cryptographic tools, including generators in mathematical structure of a group where the decisional Diffie-Hellman (DDH) problem is hard (e.g., prime order groups over integers, represented as quadratic residues mod a strong prime).

The systems are based on "blind signatures" which can be based on the same groups or on signing technology like the RSA function. The blind signature can result in a regular publicly verifiable signature or a privately verifiable signature (verifiable by the IdP only). This implies that only client-side support for exponentiation mod a prime and RSA operations (exponentiation and finding inverse mod an RSA composite N) and related operations are needed, on par with SSL client-side support.

The systems also include subsystems and protocols for the following tasks: (1) user's first pseudonym registration at an IdP, (2) user's second pseudonym registration at the RP (when desired for pseudonymous access at the RP), (3) access token request by a user to an IdP (for both access only tokens, and/or access and attestation of selective partial disclosure of user properties), (4) token modification (blinding) by the user, and (5) pseudonym use by user at the RP with and without maintaining user-based linkability, (6) user proof of its registered second pseudonym at RP, and (7) additional user processing software, routing proxy, as well as maintenance transactions (e.g., a user paying for using an IdP).

Computing Devices

Figure 7:
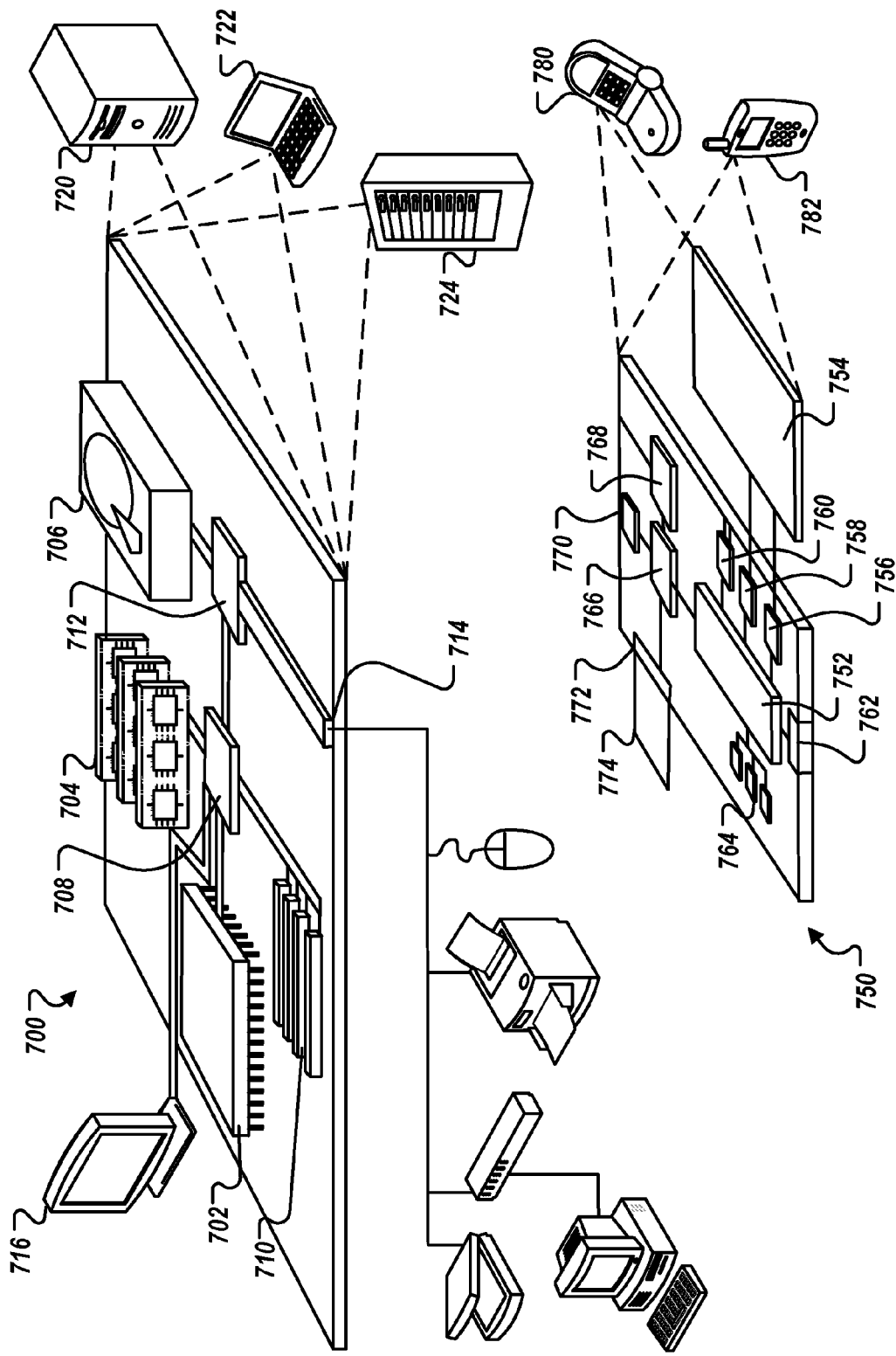
FIG. 7 is a block diagram of generic computing systems.

FIG. 7 is a block diagram of computing devices 700, 750 that may be used to implement the systems and methods described in this document, either as a client or as a server or plurality of client and servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, and low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752. Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A computer-implemented method of allowing user-selected anonymous and pseudonymous access for a user to a relying party (RP), mediated by an identity provider (IdP), comprising:
   registering with an IdP to establish a first pseudonym;
   upon successful proof of possession of the first pseudonym to the IdP, receiving a first representation of an access token from the IdP for accessing the RP;
   transforming, by a processor, the first representation of the access token to obtain a second representation of the access token, the second representation of the access token being a valid access token and is unlinkable to the first representation of the access token by the IdP;
   receiving a request from the user to access the RP;
   determining whether the request is for accessing the RP anonymously or pseudonymously;
   if the request is for anonymous access,
      providing the second representation of the access token to the RP anonymously; and
      gaining access to the RP upon verification of the second representation of the access token, the anonymous access being unlinkable to any previous and any future access at the RP, and unlinkable to the IdP's interaction with any particular user;
   if the request is for pseudonymous access,
      providing to the RP the second representation of the access token and proof of possession of a second pseudonym that is previously registered with the RP; and
      gaining access to the RP upon successful verification of the second representation of the access token and proof of possession of the second pseudonym, wherein the pseudonymous access is linkable to the second pseudonym, unlinkable to the IdP's interaction with any particular user, and unlinkable to any past and future access to the RP that does not employ the second pseudonym.

2. The method of claim 1, wherein receiving the first representation of the access token from the IdP further comprises:
   generating an original token;
   modifying the original token to obtain a modified token; and providing the modified token to the IdP to obtain an access token for accessing the RP.

3. The method of claim 2, wherein the first representation of the access token includes a signed modified token by the IdP and second representation of the access token includes a signed original token by the IdP.

4. The method of claim 2, wherein the original token is generated cryptographically from a pre-image, the pre-image supports both fixed-format and free-format information structures.

5. The method of claim 4, wherein the pre-image contains at least one of transaction-specific and user-specific information that is fully or partially revealed to the RP but not to the IdP.

6. The method of claim 4, wherein the RP is one of a plurality of RPs, the IdP is one of a plurality of IdPs, and the pre-image encodes information that is specific to the RP and the IdP.

7. The method of claim 2, wherein one or more of the original token, the modified token, and the signed modified token encode a partial disclosure based on one or more characteristics of the user known to the IdP, the partial disclosure being a confirmation of at least some characteristics required for user access at the RP.

8. The method of claim 1, wherein the first representation and the second representation of the access token are privately verifiable by the IdP, and the verification of the second representation of the access token is performed by the IdP.

9. The method of claim 1, wherein the first representation and the second representation of the access token are publicly verifiable, and the verification of the second representation of the access token is performed by the RP.

10. The method of claim 1, wherein proof of possession of the second pseudonym is made by a zero-knowledge proof, by signing, or by decrypting a challenge.

11. The method of claim 1, further comprising:
generating one or more pseudonyms for registration at the RP and the IdP using a pseudonym system, wherein the pseudonym system is operable to create an unbounded number of pseudonyms based on a fixed number of cryptographic keys.

12. The method of claim 11, further comprising:
linking or denying linkage between two pseudonyms generated by the pseudonym system in zero-knowledge.

13. The method of claim 1, further comprising:
generating a temporary pseudonym based on the second pseudonym;
interactively proving to the RP possession of the second pseudonym using the temporary pseudonym; and
expunging linkage between the temporary pseudonym and the second pseudonym.

14. The method of claim 1, further comprising:
sharing each component of a secret key used by the user with a distinct trusted authority among a plurality of trusted authorities, wherein the at least one of the first pseudonym and the second pseudonym is revoked when a quorum of the plurality of trusted authorities in possession of the each component of the secret key collude to reveal the secret key used by the user.

15. The method of claim 1, further comprising:
sharing each component of a secret key with a distinct trusted authority among a plurality of trusted authorities, wherein the first representation of the access token and the second representation of the access token is linkable to the user when a quorum of the trusted authorities in possession of the each component collude to reveal the secret employed by the user.

16. A method for providing anonymous and pseudonymous access for a user to one or more relying parties (RPs), mediated by an identity provider (IdP), comprising:
the user registering with the IdP to establish a first pseudonym in a previous session;
the user generating an original token for accessing an RP;
the user modifying the original token to obtain a modified token;
the user providing the modified token to the IdP to obtain confirmation of access authorization;
the user proving possession of the first pseudonym previously registered with the IdP to the IdP;
upon verification of the user's possession of the first pseudonym, the IdP generating a first representation of an access token by signing the modified token, the first representation of the access token containing the confirmation of access authorization at the RP;
the IdP providing the first representation of the access token to the user;
the user transforming the signed modified token to obtain a second representation of the access token, wherein the second representation of the access token is unlinkable to the first representation of the access token by the RP and the IdP individually, and is unlinkable by the RP and IdP in collusion;
the user determining whether to access the RP anonymously or pseudonymously;
if accessing the RP anonymously,
the user presenting the second representation of the access token to the RP;
if accessing the RP pseudonymously,
the user presenting the second representation and proof of possession of a second pseudonym, the second pseudonym being a pseudonym previously registered with the RP;
upon receiving the second representation of the access token, the RP verifying the second representation of the access token; and
if access is anonymous,
the RP providing access to the user upon verification of the second representation of the access token;
if access is pseudonymous,
the RP providing access to the user upon successful verification of the second representation of the access token and successful verification of the proof of possession of the second pseudonym.

17. The method of claim 16, wherein the first representation of the access token is privately verifiable by the IdP, and the method further comprises:
the RP presenting the second representation of the access token to the IdP for verification; and
the IdP verifying the second representation of the access token.

18. The method of claim 16, wherein the first representation is publicly verifiable, and the method further comprises:
the RP verifying the second representation of the access token.

19. The method of claim 16, further comprising:
the user generating a pre-image of the token, wherein the pre-image supports fixed-format and free-format data structures; and
the user presenting the pre-image to the RP, but not to the IdP.

20. The method of claim 19, wherein the pre-image encodes information that is variable in content, format, or size based on user specification.

21. The method of claim 19, wherein the RP is one of a plurality of RPs, the IdP is one of a plurality of IdPs, and the pre-image encodes information that is specific to the RP and the IdP.

22. The method of claim 16, wherein proof of possession of the second pseudonym is made by a zero-knowledge proof, by signing, or by decrypting a challenge.

23. The method of claim 16, further comprising:
the user generating one or more pseudonyms for registration at the RP and the IdP using a pseudonym system, wherein the pseudonym system is operable to create an unbounded number of pseudonyms based on a fixed number of cryptographic keys.

24. The method of claim 23, further comprising:
the user linking or denying linkage between two pseudonyms generated using the pseudonym system in zero knowledge.

25. The method of claim 23, further comprising:
the user generating a temporary pseudonym based on the second pseudonym;
the user interactively proving possession of the second pseudonym to the RP using the temporary pseudonym; and
the user expunging linkage between the temporary pseudonym and the second pseudonym.

26. The method of claim 16, further comprising:
the IdP selectively encodes a partial disclosure in the information token based on one or more characteristics of the user known to the IdP, the partial disclosure being a confirmation of at least some characteristics required for user access at the RP.

27. The method of claim 26, wherein the partial disclosure is based on a signature scheme associated with the characteristics required for user access at the RP.

28. The method of claim 16, further comprising:
the user generating a pre-image, the pre-image supports both fixed-format and free-format data structures, and a predetermined portion of the pre-image encodes a partial disclosure required for user access at the RP;
the user generating a plurality of original tokens based on the pre-image;
the user blinding the plurality of original tokens using a plurality of secret keys to obtain a plurality of blinded tokens;
the user presenting the plurality of blinded tokens to the IdP;
the IdP designating one blinded token from the plurality of tokens to remain blinded;
the user revealing a pre-determined portion of the pre-image and the secret keys for unblinding the plurality of blinded tokens except for the designated blinded token;
the IdP unblinding the plurality of blinded tokens using the secret keys except for the designated blinded token;
the IdP verifying that the partial disclosure encoded in the pre-determined portion of the pre-image is faithfully represented in each of the plurality of unblinded tokens; and
the IdP signing the designated blinded token to obtain the first representation of the access token before providing the first representation of the access token to the user.

29. The method of claim 16, further comprising:
the user sharing each component of a secret key with a distinct trusted authority among a plurality of trusted authorities, wherein the first and the second representations of the access token are revoked when a quorum of the trusted authorities in possession of the each component collude to revealed the secret key to the IdP.

30. The method of claim 16, further comprising:
the user sharing each component of a secret key with a distinct trusted authority along a plurality of trusted authorities, wherein the first representation of the access token and the second representation of the access token is linkable to the user when a quorum of the trusted authorities in possession of the each component collude to reveal information encrypted under the secret key.

31. A tangible computer-readable medium encoded with a computer program, the program comprising instructions that when executed by one or more computers cause the one or more computers to perform operations comprising:
registering with an IdP to establish a first pseudonym;
upon successful proof of possession of the first pseudonym to the IdP, receiving a first representation of an access token from the IdP for accessing the RP;
transforming, by a processor, the first representation of the access token to obtain a second representation of the access token, the second representation of the access token being a valid access token and is unlinkable to the first representation of the access token by the IdP;
receiving a request from the user to access the RP;
determining whether the request is for accessing the RP anonymously or pseudonymously;
if the request is for anonymous access,
providing the second representation of the access token to the RP anonymously; and
gaining access to the RP upon verification of the second representation of the access token, the anonymous access being unlinkable to any previous and any future access at the RP, and unlinkable to the IdP's interaction with any particular user;
if the request is for pseudonymous access,
providing to the RP the second representation of the access token and proof of possession of a second pseudonym that is previously registered with the RP; and
gaining access to the RP upon successful verification of the second representation of the access token and proof of possession of the second pseudonym, wherein the pseudonymous access is linkable to the second pseudonym, unlinkable to the IdP's interaction with any particular user, and unlinkable to any past and future access to the RP that does not employ the second pseudonym.

32. The computer-readable medium of claim 31, wherein receiving the first representation of the access token from the IdP further comprises:
generating an original token;
modifying the original token to obtain a modified token; and
providing the modified token to the IdP to obtain an access token for accessing the RP.

33. The computer-readable medium of claim 32, wherein the first representation of the access token includes a signed modified token by the IdP and second representation of the access token includes a signed original token by the IdP.

34. The computer-readable medium of claim 32, wherein the original token is generated cryptographically from a pre-image, the pre-image supports both fixed-format and free-format information structures.

35. The computer-readable medium of claim 34, wherein the pre-image contains at least one of transaction-specific and user-specific information that is fully or partially revealed to the RP but not to the IdP.

36. The computer-readable medium of claim 34, wherein the RP is one of a plurality of RPs, the IdP is one of a plurality of IdPs, and the pre-image encodes information that is specific to the RP and the IdP.

37. The computer-readable medium of claim 32, wherein one or more of the original token, the modified token, and the signed modified token encode a partial disclosure based on one or more characteristics of the user known to the IdP, the partial disclosure being a confirmation of at least some characteristics required for user access at the RP.

38. The computer-readable medium of claim 31, wherein the first representation and the second representation of the access token are privately verifiable by the IdP, and the verification of the second representation of the access token is performed by the IdP.

39. The computer-readable medium of claim 31, wherein the first representation and the second representation of the access token are publicly verifiable, and the verification of the second representation of the access token is performed by the RP.

40. The computer-readable medium of claim 31, wherein proof of possession of the second pseudonym is made by a zero-knowledge proof, by signing, or by decrypting a challenge.

41. The computer-readable medium of claim 31, wherein the operations further comprise:
generating one or more pseudonyms for registration at the RP and the IdP using a pseudonym system, wherein the pseudonym system is operable to create an unbounded number of pseudonyms based on a fixed number of cryptographic keys.

42. The computer-readable medium of claim 41, wherein the operations further comprise:
linking or denying linkage between two pseudonyms generated by the pseudonym system in zero-knowledge.

43. The computer-readable medium of claim 31, wherein the operations further comprise:
generating a temporary pseudonym based on the second pseudonym;
interactively proving to the RP possession of the second pseudonym using the temporary pseudonym; and
expunging linkage between the temporary pseudonym and the second pseudonym.

44. The computer-readable medium of claim 31, wherein the operations further comprise:
sharing each component of a secret key used by the user with a distinct trusted authority among a plurality of trusted authorities, wherein the at least one of the first pseudonym and the second pseudonym is revoked when a quorum of the plurality of trusted authorities in possession of the each component of the secret key collude to reveal the secret key used by the user.

45. The computer-readable medium of claim 31, wherein the operations further comprise:
sharing each component of a secret key with a distinct trusted authority among a plurality of trusted authorities, wherein the first representation of the access token and the second representation of the access token is linkable to the user when a quorum of the trusted authorities in possession of the each component collude to reveal the secret employed by the user.

46. A system comprising:
one or more computers; and
a tangible computer-readable medium coupled to the one or more computers having instructions stored thereon which, when executed by the one or more computers, cause the one or more computers to perform operations comprising:
registering with an IdP to establish a first pseudonym;
upon successful proof of possession of the first pseudonym to the IdP, receiving a first representation of an access token from the IdP for accessing the RP;
transforming, by a processor, the first representation of the access token to obtain a second representation of the access token, the second representation of the access token being a valid access token and is unlinkable to the first representation of the access token by the IdP;
receiving a request from the user to access the RP;
determining whether the request is for accessing the RP anonymously or pseudonymously;
if the request is for anonymous access,
providing the second representation of the access token to the RP anonymously; and
gaining access to the RP upon verification of the second representation of the access token, the anonymous access being unlinkable to any previous and any future access at the RP, and unlinkable to the IdP's interaction with any particular user;
if the request is for pseudonymous access,
providing to the RP the second representation of the access token and proof of possession of a second pseudonym that is previously registered with the RP; and
gaining access to the RP upon successful verification of the second representation of the access token and proof of possession of the second pseudonym, wherein the pseudonymous access is linkable to the second pseudonym, unlinkable to the IdP's interaction with any particular user, and unlinkable to any past and future access to the RP that does not employ the second pseudonym.

* * * * *